(12) United States Patent
Witte et al.

(10) Patent No.: US 10,737,926 B2
(45) Date of Patent: *Aug. 11, 2020

(54) CONNECTING DEVICE AND TAPPING ASSEMBLY AS WELL AS A CONTAINER AND METHOD FOR BEVERAGE DISPENSING

(71) Applicant: HEINEKEN SUPPLY CHAIN B.V., Amsterdam (NL)

(72) Inventors: Pieter Gerard Witte, The Hague (NL); Arie Maarten Paauwe, Naaldwijk (NL); Bart Jan Bax, Blaricum (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,479

(22) Filed: Feb. 5, 2018

(65) Prior Publication Data

US 2018/0170743 A1 Jun. 21, 2018

Related U.S. Application Data

(63) Continuation of application No. 14/416,948, filed as application No. PCT/NL2013/050556 on Jul. 26, 2013, now Pat. No. 9,957,146.

(30) Foreign Application Priority Data

Jul. 26, 2012 (NL) ...................................... 2009237

(51) Int. Cl.
*B67D 1/08* (2006.01)
*B67D 1/04* (2006.01)
(Continued)

(52) U.S. Cl.
CPC ............ *B67D 1/0841* (2013.01); *B29C 49/20* (2013.01); *B65D 77/06* (2013.01); *B67D 1/0004* (2013.01);
(Continued)

(58) Field of Classification Search
CPC .. B67D 1/0848; B67D 1/0845; B67D 1/0839; B67D 1/0831; B67D 1/0835
(Continued)

(56) References Cited

U.S. PATENT DOCUMENTS 3,596,809 A * 8/1971 Taubenheim ........ B67D 1/0831
137/212
3,637,117 A * 1/1972 Johnston .............. B67D 1/0802
222/400.7
(Continued)

FOREIGN PATENT DOCUMENTS

CA 2880066 A1 * 1/2014 ............. B29B 11/14
CN 87100508 A 8/1987
(Continued)

*Primary Examiner* — Patrick M. Buechner
*Assistant Examiner* — Michael J. Melaragno
(74) *Attorney, Agent, or Firm* — Pearne & Gordon LLP

(57) ABSTRACT

Device 5 for connecting a gas line 6 to a bag-in-container type of container 3, comprising a first 61 and a second part 62, movably connected to said first part 61, wherein one of the first or second part 61, 62 comprises a coupling opening 60 with coupling elements 67 for connecting the device 5 to a part of a bag-in-container type container 3 extending inside coupling opening 60. The connecting device 5 comprises a connecting element 70, movable between an extended position wherein the connecting element 70 extends partly inside coupling opening 60 and a retracted position in which the connecting element 70 extends less or not into coupling opening 60, the connecting device 5 further comprising a mechanism 72 for moving the connecting element 70

(Continued)

Figure 1:
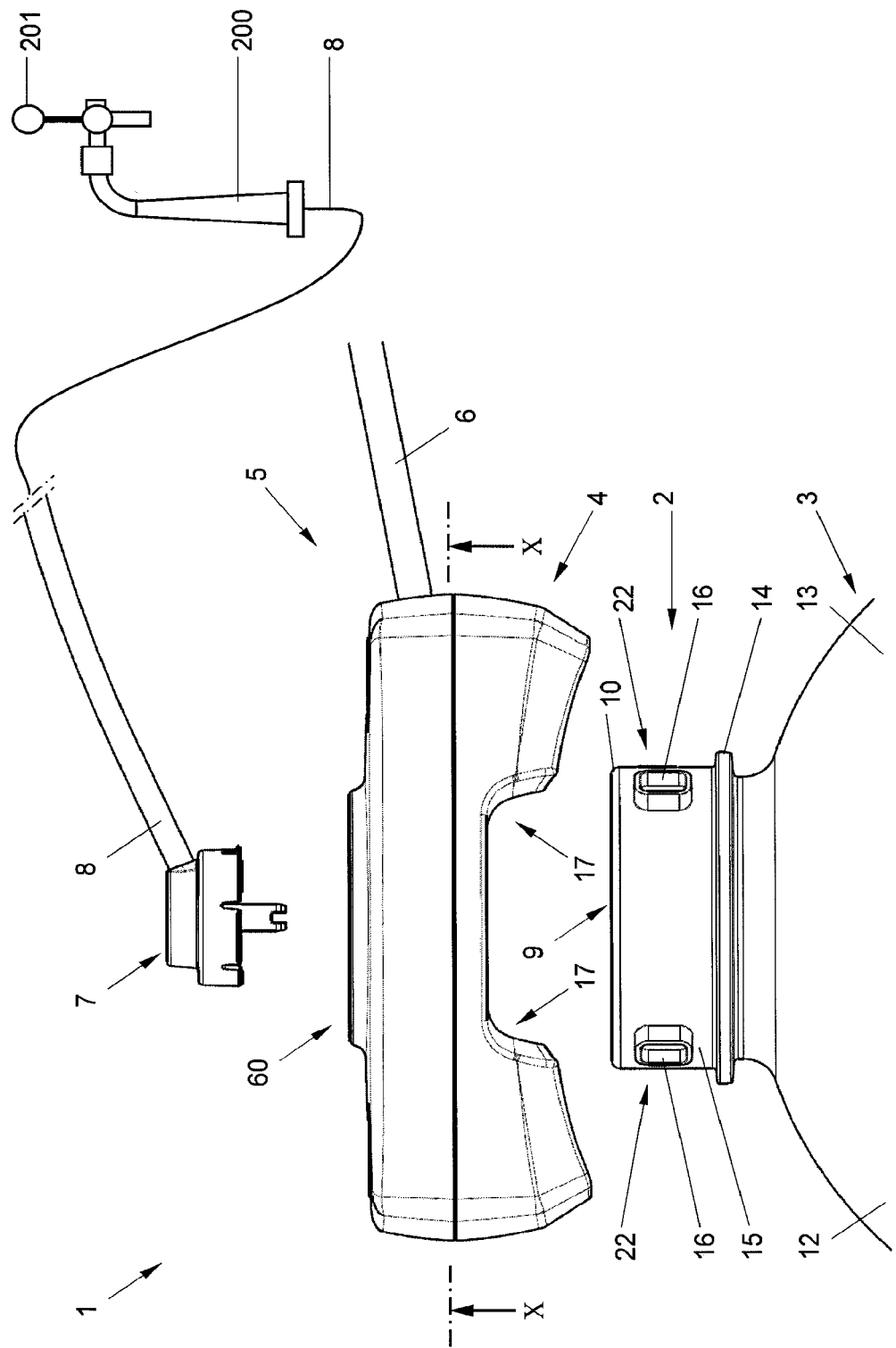

between the extended and the retracted position by relative movement of first and second parts 61, 62.

15 Claims, 30 Drawing Sheets

(51) Int. Cl.
*B29C 49/20* (2006.01)
*B29L 31/00* (2006.01)
*B65D 77/06* (2006.01)
*B67D 1/00* (2006.01)

(52) U.S. Cl.
CPC ......... *B67D 1/0462* (2013.01); *B67D 1/0801* (2013.01); *B67D 1/0831* (2013.01); *B67D 1/0835* (2013.01); *B29C 2049/2008* (2013.01); *B29L 2031/712* (2013.01); *B67D 2001/0822* (2013.01); *Y10T 137/0458* (2015.04); *Y10T 137/613* (2015.04)

(58) Field of Classification Search
USPC ............ 222/317, 303, 105, 182, 183, 383.1, 222/400.2, 483, 553
See application file for complete search history.

(56) References Cited

U.S. PATENT DOCUMENTS

| | | | | |
|---|---|---|---|---|
| 3,905,522 A * | 9/1975 | Johnston | ............. | B67D 1/0831 137/212 |
| 3,908,861 A * | 9/1975 | Johnston | ............. | B67D 1/0802 137/212 |
| 4,648,534 A * | 3/1987 | Esser | ............. | B67D 1/0412 222/373 |
| 4,726,494 A * | 2/1988 | Scott | ............. | B67D 1/04 222/129.3 |
| 5,031,801 A * | 7/1991 | Osgar | ............. | B67D 7/0294 222/153.01 |
| 5,435,460 A * | 7/1995 | Osgar | ............. | B65D 85/84 222/1 |
| 5,875,921 A * | 3/1999 | Osgar | ............. | B67D 7/02 222/1 |
| 5,957,328 A * | 9/1999 | Osgar | ............. | B67D 7/344 222/1 |
| 6,015,068 A * | 1/2000 | Osgar | ............. | B01J 4/00 222/105 |
| 6,206,240 B1 * | 3/2001 | Osgar | ............. | B67D 7/0255 222/389 |
| 6,266,943 B1 | 7/2001 | Nomoto et al. | | |
| 6,311,875 B1 * | 11/2001 | Anderson | ............. | B67D 1/0832 222/396 |
| 6,360,923 B1 | 3/2002 | Vlooswijk et al. | | |
| 6,516,839 B1 | 2/2003 | Timp et al. | | |
| 6,691,494 B2 | 2/2004 | Nomoto et al. | | |
| 6,745,922 B1 | 6/2004 | Vlooswijk et al. | | |
| 7,025,234 B2 * | 4/2006 | Priebe | ............. | B67D 1/0054 137/563 |
| 7,055,719 B2 | 6/2006 | Nomoto et al. | | |
| 7,093,740 B2 | 8/2006 | Vlooswijk et al. | | |
| 7,661,556 B2 | 2/2010 | Van Der Klaauw et al. | | |
| 8,360,277 B2 | 1/2013 | Rasmussen | | |
| 8,499,801 B2 | 8/2013 | Wild et al. | | |
| 8,844,774 B2 | 9/2014 | Leys et al. | | |
| 8,931,651 B2 | 1/2015 | Van Hove et al. | | |
| 9,051,167 B2 * | 6/2015 | Burge | ............. | B67D 1/0462 |
| 9,556,012 B2 | 1/2017 | Leys et al. | | |
| 9,650,169 B2 * | 5/2017 | Tom | ............. | B67D 7/025 |
| 9,963,279 B2 * | 5/2018 | Huber | ............. | B67D 3/0032 |
| 2001/0027154 A1 | 10/2001 | Nomoto et al. | | |
| 2003/0173376 A1 | 9/2003 | Bilskie et al. | | |
| 2004/0069368 A1 | 4/2004 | Van Der Klaauw et al. | | |
| 2004/0112921 A1 * | 6/2004 | Nomoto | ............. | B05B 11/3047 222/321.9 |
| 2004/0134939 A1 * | 7/2004 | van Der Klaauw | ............. | B67D 1/0829 222/400.7 |
| 2004/0226967 A1 | 11/2004 | Van Der Klaauw et al. | | |
| 2005/0230437 A1 | 10/2005 | Vlooswijk et al. | | |
| 2006/0278302 A1 * | 12/2006 | Wild | ............. | B65B 3/045 141/65 |
| 2008/0257846 A1 | 10/2008 | Van Hove et al. | | |
| 2009/0020176 A1 * | 1/2009 | Hasegawa | ............. | B67D 7/0261 137/614.05 |
| 2009/0057347 A1 * | 3/2009 | Leys | ............. | B65D 83/0055 222/386.5 |
| 2010/0112815 A1 * | 5/2010 | O'Dougherty | ............. | B67D 7/0261 438/689 |
| 2010/0181338 A1 | 7/2010 | Rasmussen | | |
| 2010/0237035 A1 | 9/2010 | Van Hove et al. | | |
| 2010/0252584 A1 * | 10/2010 | Celli | ............. | B67D 1/0081 222/400.7 |
| 2011/0210141 A1 * | 9/2011 | Maas | ............. | B08B 9/0321 222/1 |
| 2011/0210148 A1 * | 9/2011 | Nelson | ............. | B67D 7/025 222/386.5 |
| 2012/0132607 A1 | 5/2012 | Landman et al. | | |
| 2012/0138161 A1 | 6/2012 | Wolthers | | |
| 2015/0001250 A1 | 1/2015 | Leys et al. | | |
| 2015/0175399 A1 * | 6/2015 | Witte | ............. | B67D 1/0462 137/15.12 |
| 2015/0210524 A1 * | 7/2015 | Witte | ............. | B29C 49/06 222/394 |
| 2015/0282651 A1 * | 10/2015 | Paauwe | ............. | B67D 1/0835 215/40 |
| 2015/0284157 A1 * | 10/2015 | Paauwe | ............. | B67D 1/0462 215/260 |
| 2016/0236820 A1 * | 8/2016 | Paauwe | ............. | B65D 25/16 |

FOREIGN PATENT DOCUMENTS

| | | |
|---|---|---|
| CN | 1876504 A | 12/2006 |
| CN | 101263075 A | 9/2008 |
| CN | 101970311 A | 2/2011 |
| EP | 0759399 A1 | 2/1997 |
| EP | 1064221 A1 | 1/2001 |
| EP | 1289874 A2 | 3/2003 |
| EP | 1506129 A1 | 2/2005 |
| EP | 1947029 A1 | 7/2008 |
| EP | 2148771 A1 | 2/2010 |
| JP | H0531791 A | 2/1993 |
| WO | 0003944 A1 | 1/2000 |
| WO | 0035803 A1 | 6/2000 |
| WO | 03022729 A1 | 3/2003 |
| WO | 2008075388 A1 | 6/2008 |
| WO | 2011002294 A2 | 1/2011 |
| WO | 2011002295 A1 | 1/2011 |

* cited by examiner

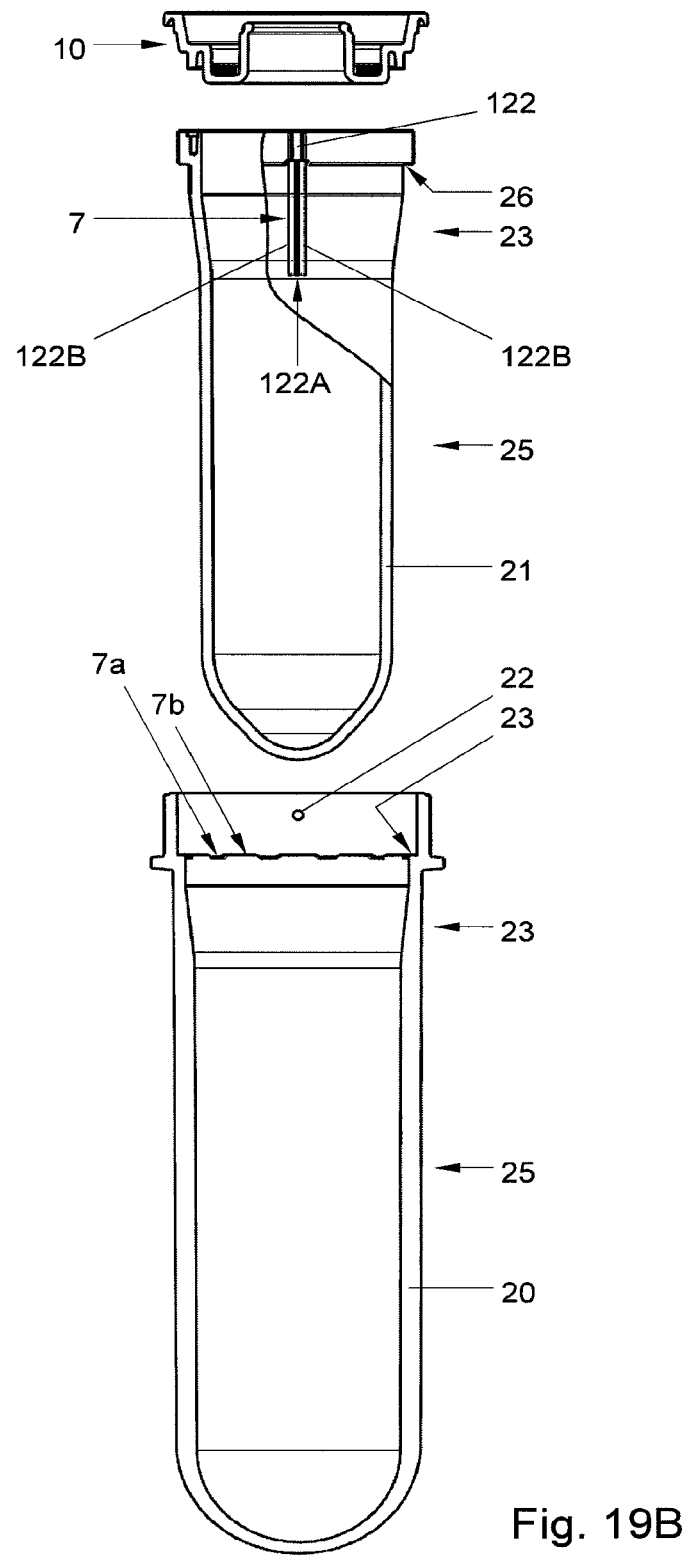
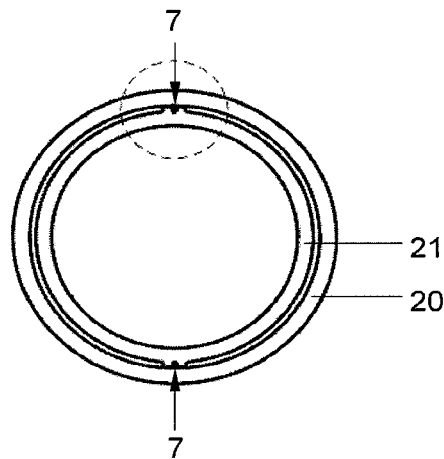
Fig. 19C
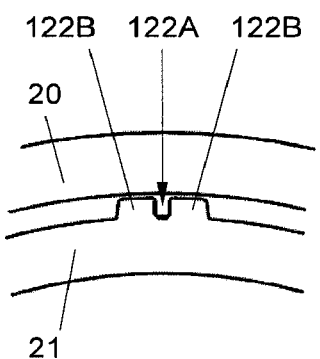
Fig. 19D
Fig. 19B

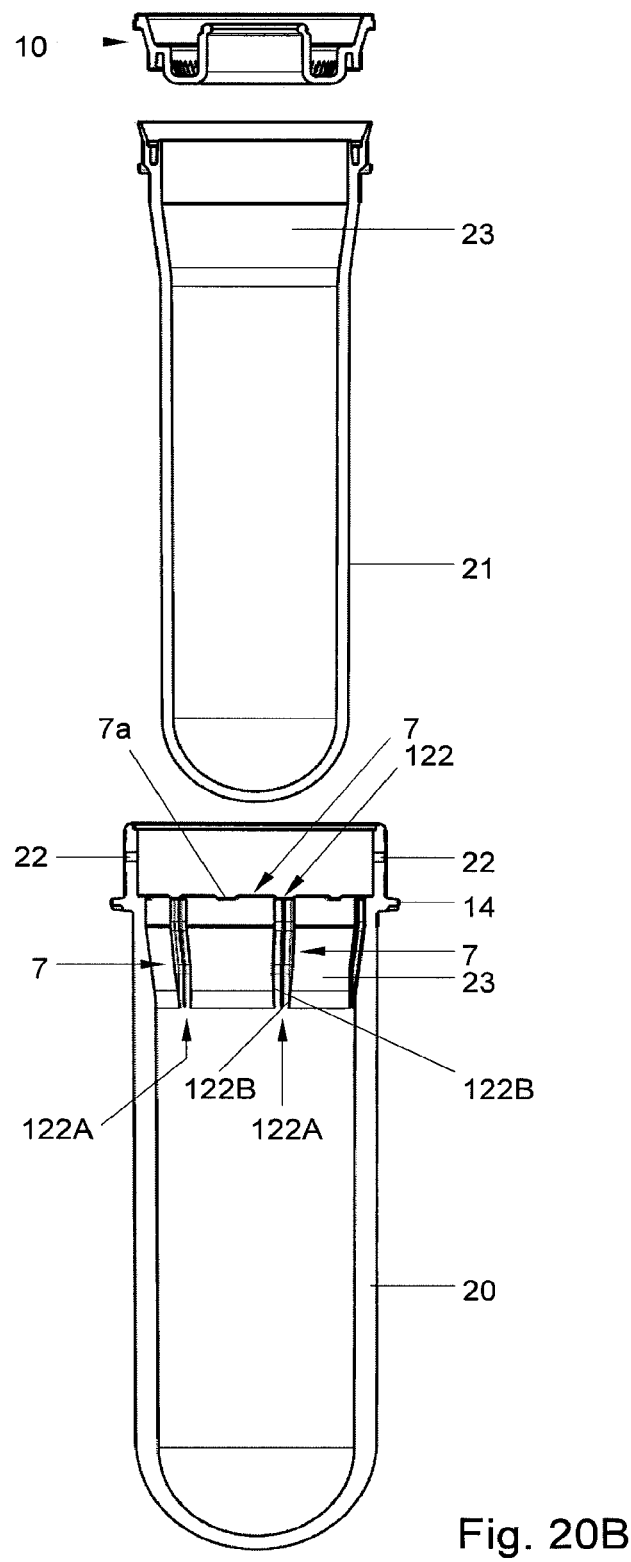
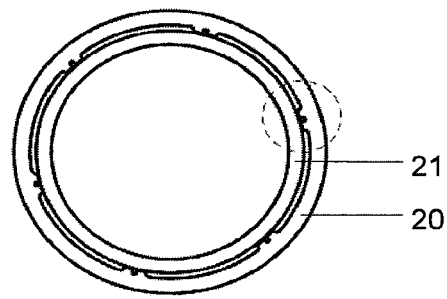
Fig. 20C
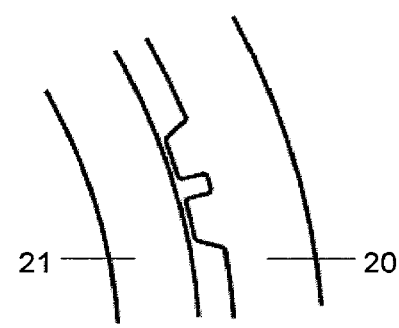
Fig. 20D
Fig. 20B

CONNECTING DEVICE AND TAPPING ASSEMBLY AS WELL AS A CONTAINER AND METHOD FOR BEVERAGE DISPENSING

The invention relates to a connecting device for connecting at least a gas line to a bag-in-container (BIC) type container for dispensing beverage.

The invention further relates to a tapping assembly for dispensing beverages. The invention especially but not exclusively relates to such tapping assembly for dispensing a beverage from a bag-in-container type container.

The invention further relates to a connecting device for connecting a dispense line or dispense tube or such dispense element and a gas line to a container.

The invention further relates to a container, especially of a bag-in-container type, and a set of preforms for forming the same.

The invention further relates to a method for forming a container, especially of the bag-in-container type.

It is known to dispense beverages such as carbonated beverages, especially beer, from a rigid metal or wooden container such as a keg, barrel or cask by feeding pressurised gas, such as $CO_2$ into the container, forcing the beverage out of the container.

In an alternative system, as for example known from Heineken's DraughtKeg® and disclosed in for example EP1064221, a beverage container can be provided with an integrated, for example internal pressurizer, with which preferably automatically gas is introduced into the container in order to pressurise the beverage for dispensing and maintain as much as possible a constant pressure inside the container.

It has further been known, as is for example known from Heineken's BeerTender® and disclosed in WO00/03944, to dispense beverages from a bag-in-container type of container, in which a beverage is contained inside a flexible inner container, which is suspended in a more rigid outer container. In such system a pressurising gas can be inserted into the container, between the inner and outer container, thereby compressing the bag or inner container, squeezing out the beverage without the pressurising gas coming into direct contact with the beverage.

In EP2148771 an integrally blow moulded bag-in-container is disclosed, for holding and dispensing beverages, wherein at least one vent is provided running parallel to an interface between inner and outer containers, which vent opens to the atmosphere at a location adjacent to and orientated approximately coaxially with the bag-in-container's mouth. EP2148771 fails to disclose how this container is used in a dispensing assembly, especially how this is to be connected to a tapping line or tapping device.

WO2011/002295 further discloses a system in which a container is compressed within a pressure chamber, such that beverage contained within the container is dispensed. This requires a strong pressure chamber and an air tight closure of the pressure chamber to the container.

WO2011/002294 discloses an integrally blow moulded bag-in-container type container, wherein at a neck region of the inner container an opening is provided, opening into a space between the inner and outer container. A closure can be provided, with a valve and a gas feed channel, connecting to said opening for feeding gas under pressure into said space. The full gas pressure is therein exerted on the neck region of the outer container, in the neck region. In an alternative embodiment the opening could be in the neck of the outer preform or container.

The present invention aims at providing an alternative connecting device, an alternative tapping assembly, an alternative container, an alternative preform assembly and/or an alternative method for forming a beverage container. The present invention aims at providing a tapping assembly and parts therefore, especially a connecting device that provide for easy and safe use.

In a first aspect the present invention can be characterised by a connecting device for connecting at least a gas line to a bag-in-container type of container. The connecting device comprises a first part and a second part, movably connected to said first part, wherein at least one of the first and/or second part is provided with a coupling opening with coupling elements for connecting the connecting device to a part of a bag-in-container type container extending inside said coupling opening. The connecting device is further provided with at least one connecting element, movable between an extended position in which the connecting element extends at least partly inside said coupling opening and a retracted position in which the connecting element extends less or not into said coupling opening. The connecting device further comprises a mechanism for moving the at least one connecting element between the extended position and the retracted position by relative movement of the first and second parts.

In a second aspect the present disclosure can be characterised by a tapping assembly for a beverage, comprising a connecting device such as disclosed here above. The assembly can further comprise a first and second container, wherein the first container has a neck portion and the second container is suspended in the first container, from the neck portion thereof. The neck portion of the second container can extend at least partly and preferably entirely within the first container, for example within the neck region of the first container. This can be a bag-in-container type of container. The neck portion of the first container is provided with at least one opening in a side wall thereof, opening into a space between the first and second containers. The assembly can further comprise the connecting device, connected or connectable to the neck portion. The connecting device comprises at least one connecting element for connecting to the at least one opening, wherein the connecting element is or can be connected to a source of a pressurising fluidum, preferably a pressurised gas. With the connecting device therefore the space between the containers can be pressurised such that the inner container is squeezed for dispensing beverage contained therein.

In embodiments the first container is more rigid than the second container, at least in body portions thereof, whereas the at least one opening opens into said space in a substantially radial direction, perpendicular to a longitudinal axis of the neck region. The connecting element can connect to said at least one opening in substantially the same radial direction. Preferably the connecting element is movable relative to the opening, more preferably in said substantially radial direction, between a release position spaced apart from the opening and a connecting position gastight connecting to said opening.

The coupling opening can extend through the connecting device, wherein a connector is releasable provided in, that is from one end of the coupling opening, whereas the neck of the container can extend into the opening from the opposite side of the opening. The connector can comprise a coupler for opening a valve of a container to which the connecting device is connected and a tapping line extending from said connector. Alternatively the connecting device can comprise an opening in and/or through which a dispense line extends or can extend, which dispense line at one end is or can be connected to a dispense adaptor for connecting to and opening the valve of a container to which the connecting device is connected. In both embodiments the end of the dispense line opposite the container can be provided with a valve, especially an in-line valve. The dispense line and the dispense adapter can be disposable.

Another aspect of the invention can be characterised by a container of a bag-in-container type, wherein a neck region of an outer container is provided with at least one opening extending substantially radially there through, leading directly or indirectly to a space between the outer container and part of an inner container adjacent thereto. The neck region is provided with coupling elements, preferably at opposite sides of said at least one opening, seen in circumferential direction, for coupling of a connecting device thereto. These coupling elements are preferably placed and/or designed such that they define a position of a connecting device relative to the container such that a connecting element of the connecting device is positioned correctly relative to the at least one opening.

Another aspect of the invention can be characterised by a method for forming a container, wherein a bag-in-container is blow moulded integrally from at least two super positioned preforms or an integral, multilayer preform, such that an outer container and an inner container or bag are formed. Prior to or after blow moulding the container a closure ring is spin welded onto the inner and outer container, closing off a space between the inner and outer containers. Alternatively or additionally the two preforms or containers can be welded, especially spin welded or otherwise connected to each other at the neck regions, closing off the space between the containers or preforms. At least one opening is provided in a peripheral wall of a neck region of one of the containers, preferably the outer container, opening into said space, for introducing gas under pressure into said space and compressing the inner container within the outer container. The inner container is filled with beverage and a valve is mounted in or on an opening in said ring, opening into said inner container.

Preforms and preform assemblies will be discussed and disclosed too for forming a container.

Figure 2:
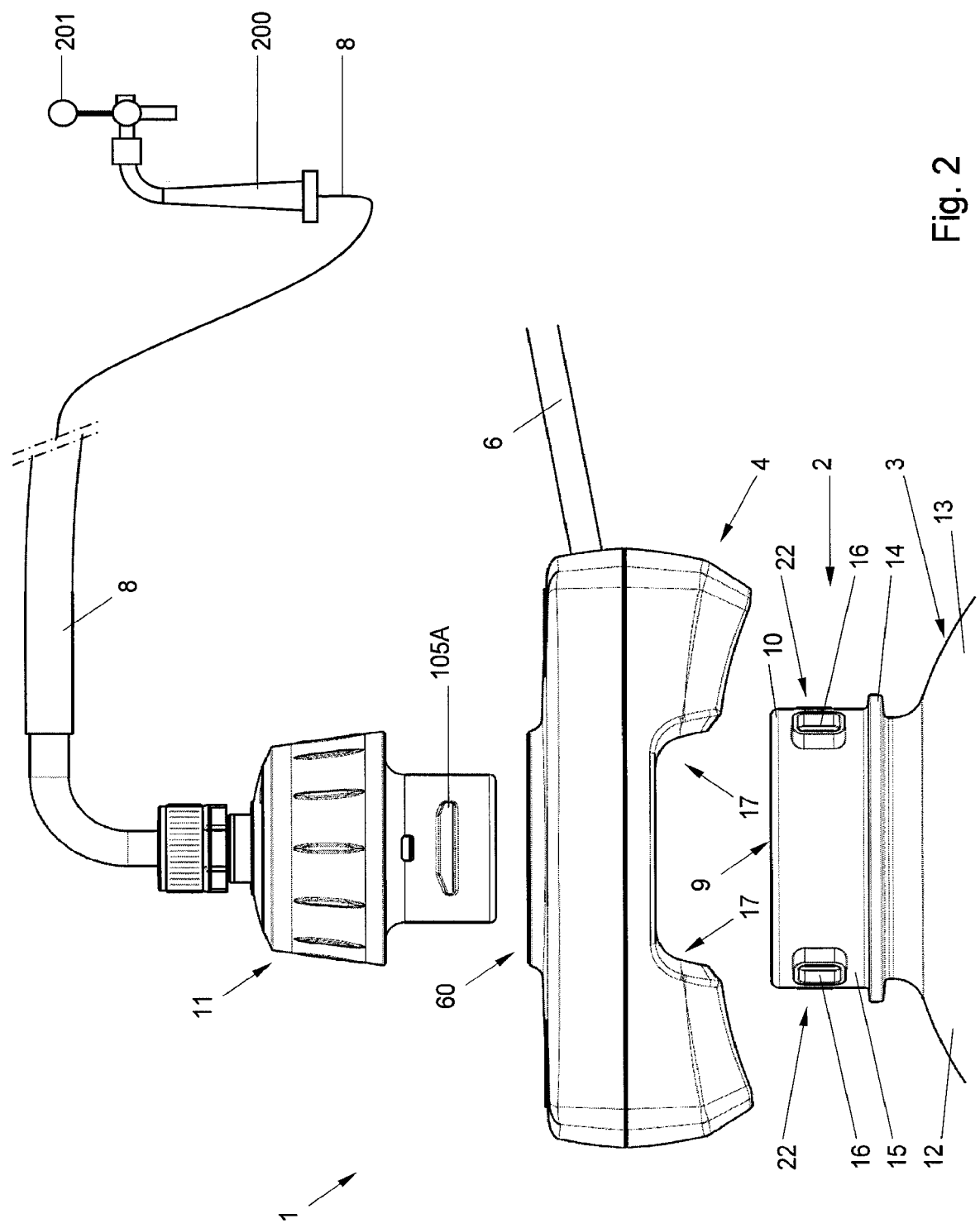
Figure 3:
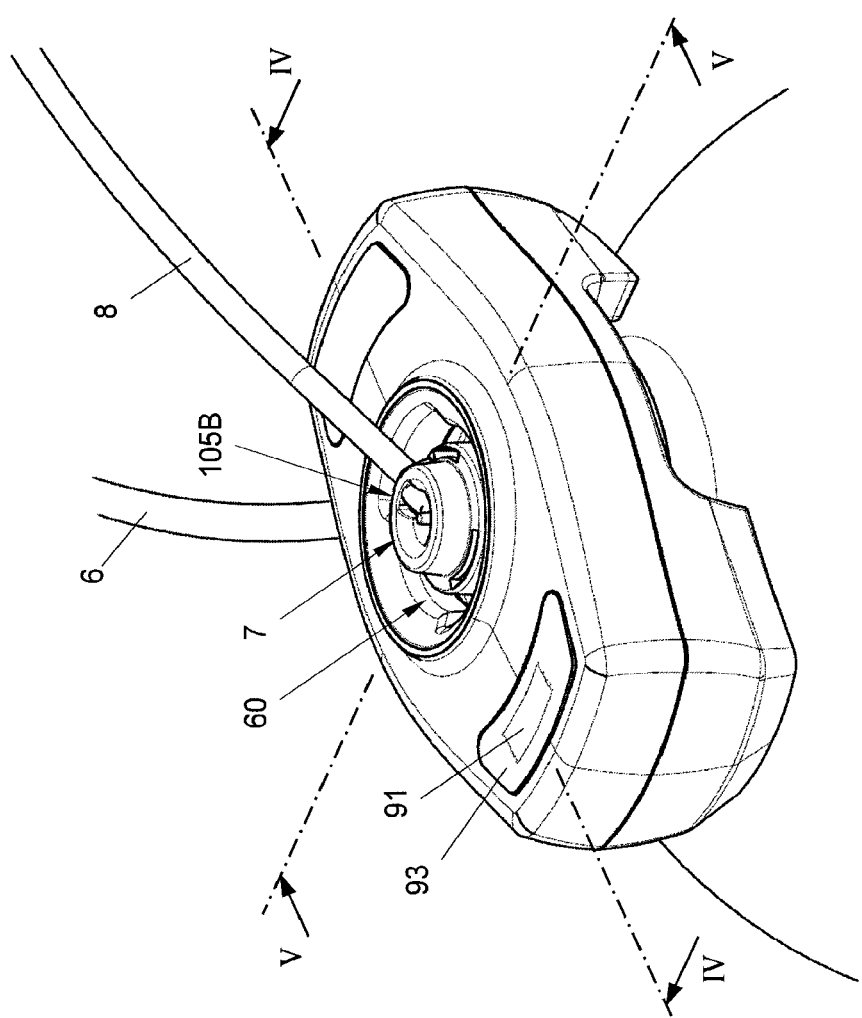
Figure 4:
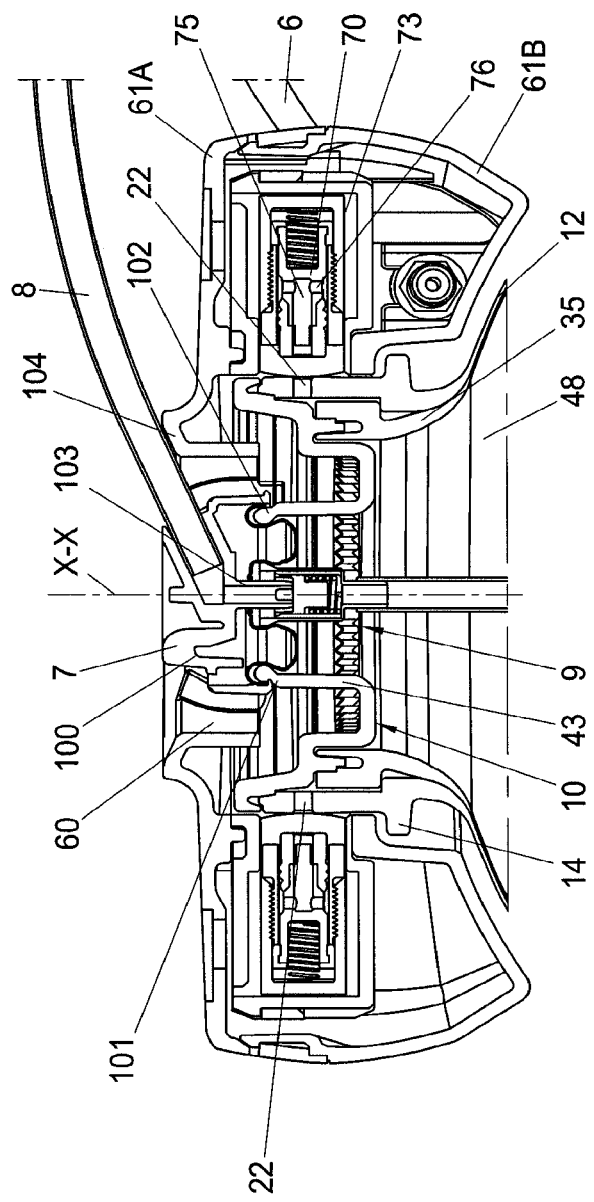
Figure 5:
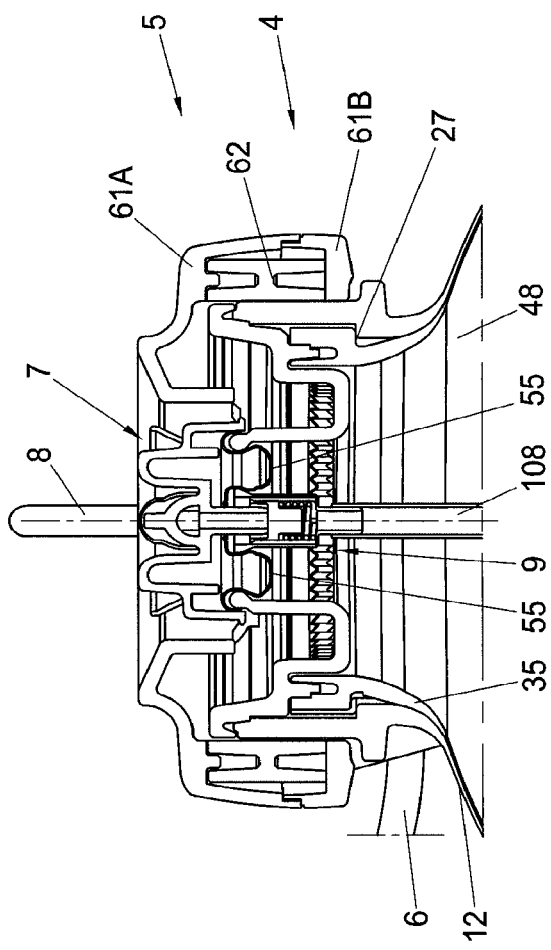
Figure 5A:
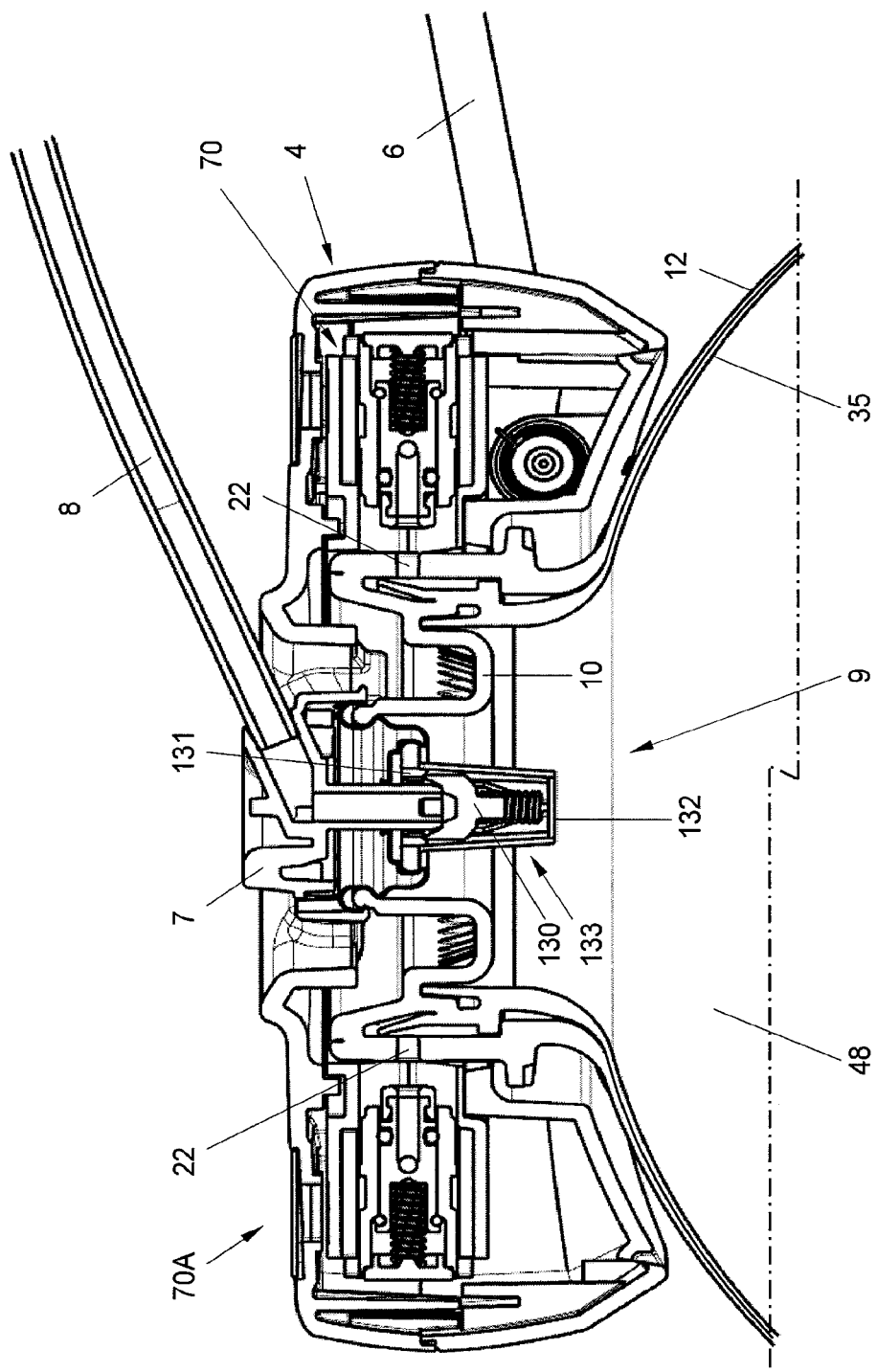
Figure 6:
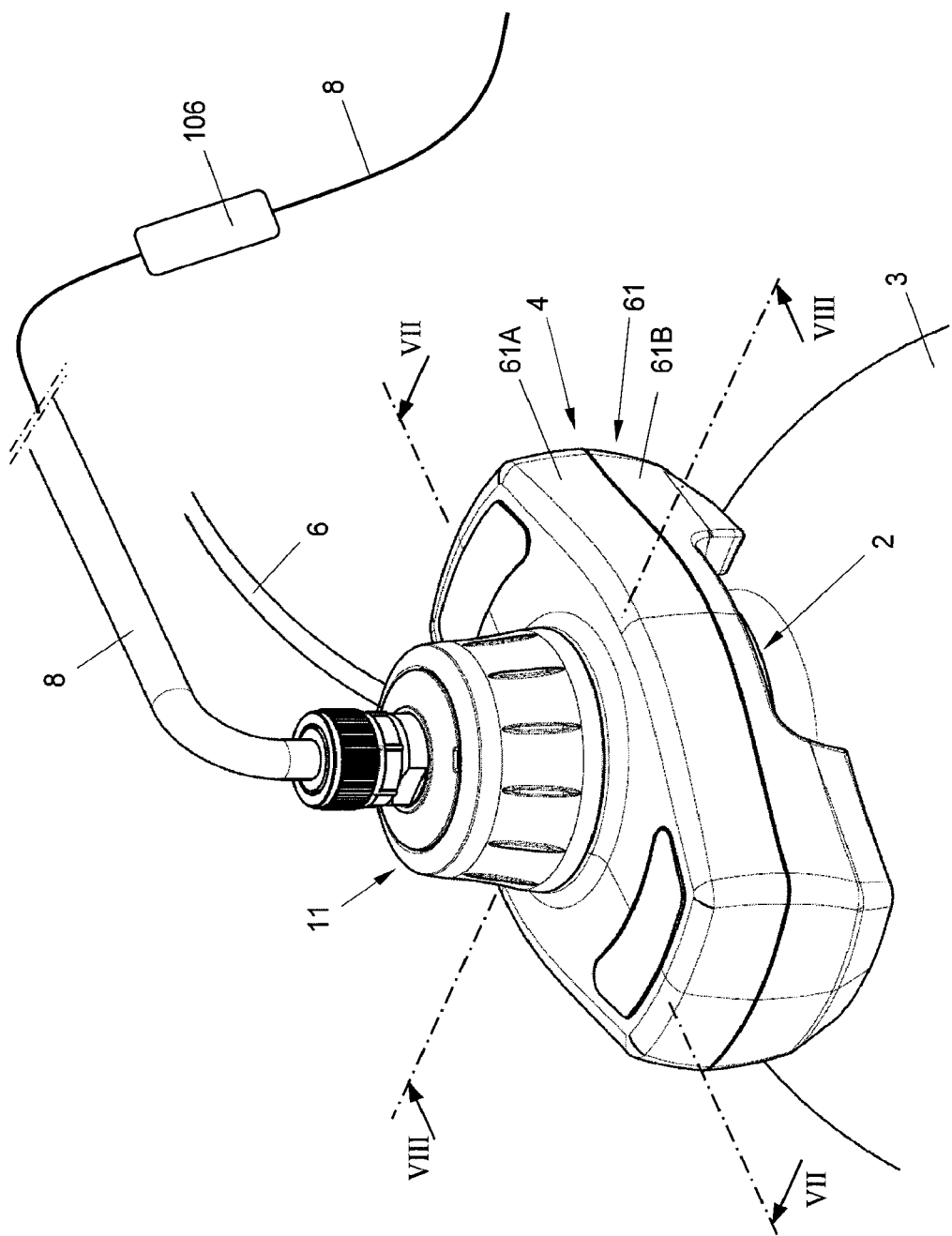
Figure 7:
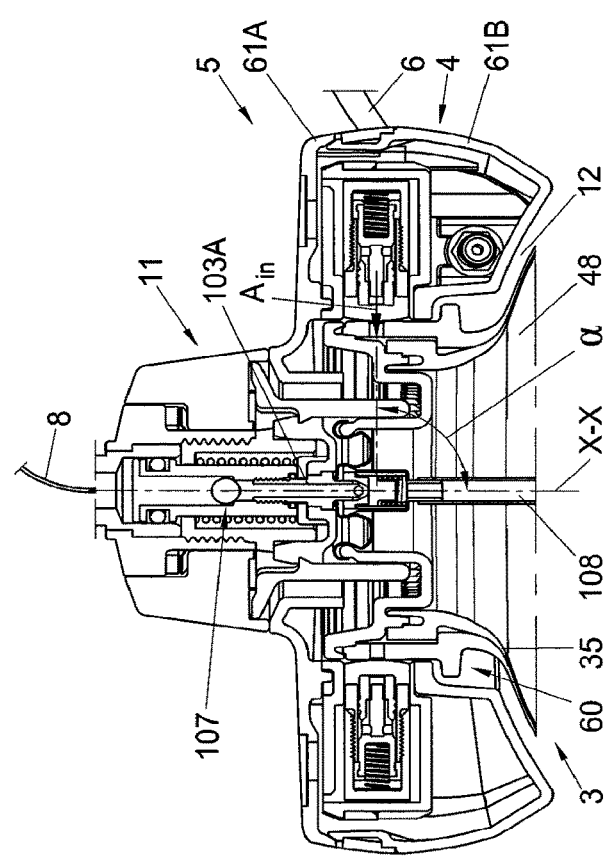
Figure 8:
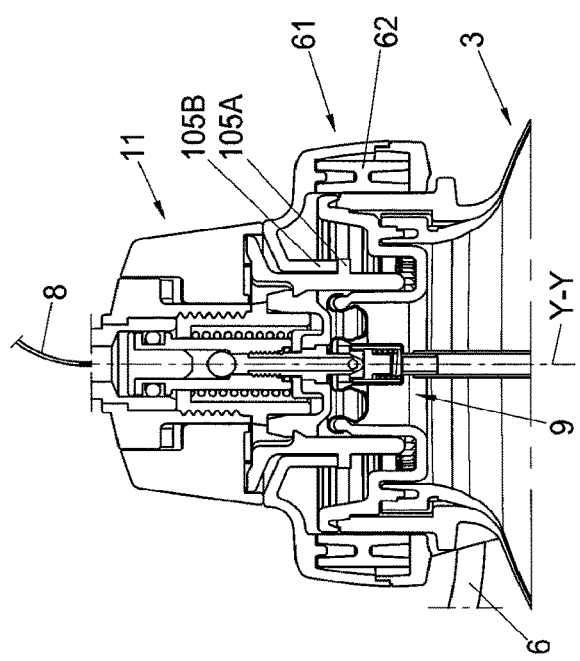
Figure 9:
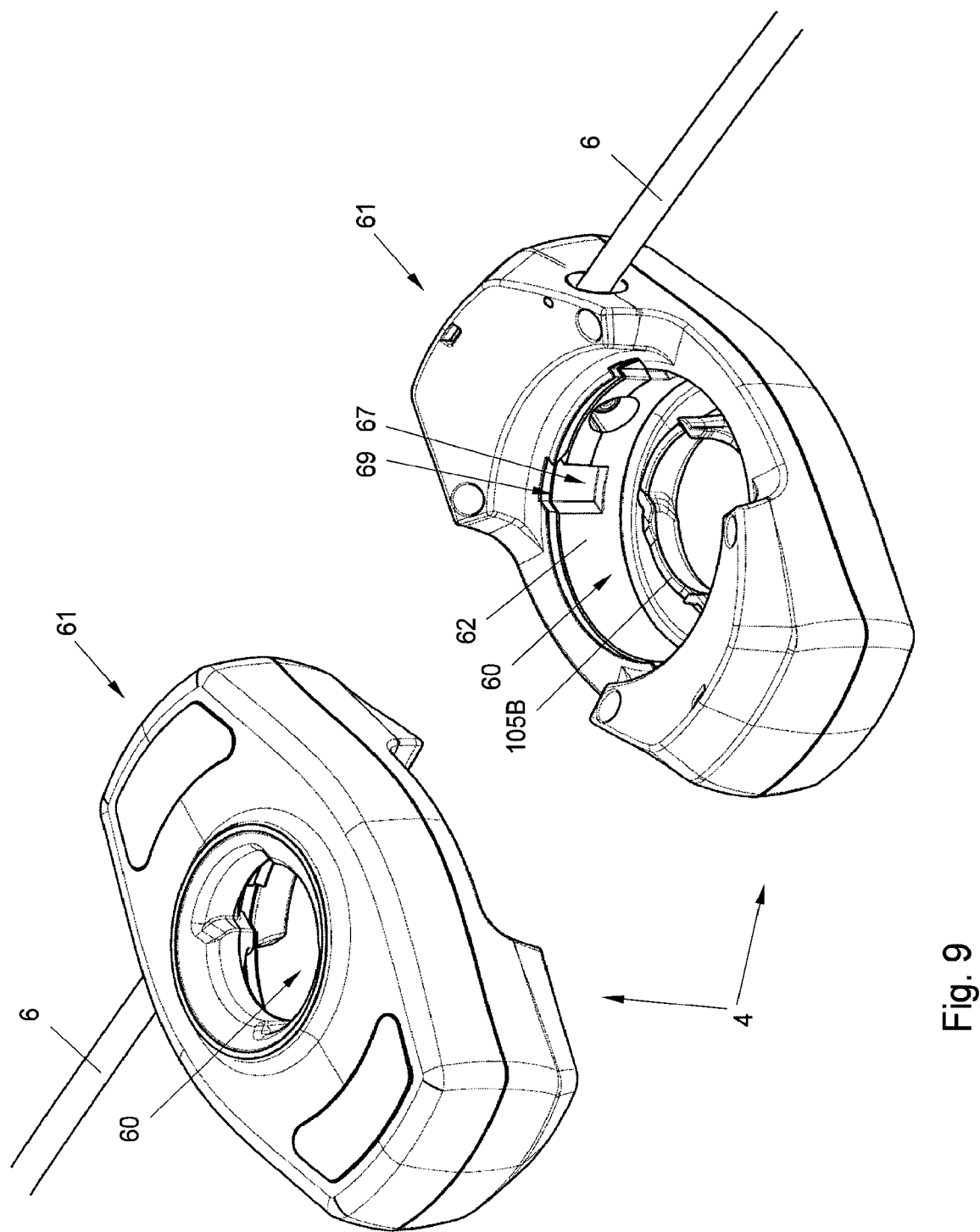
Figure 10:
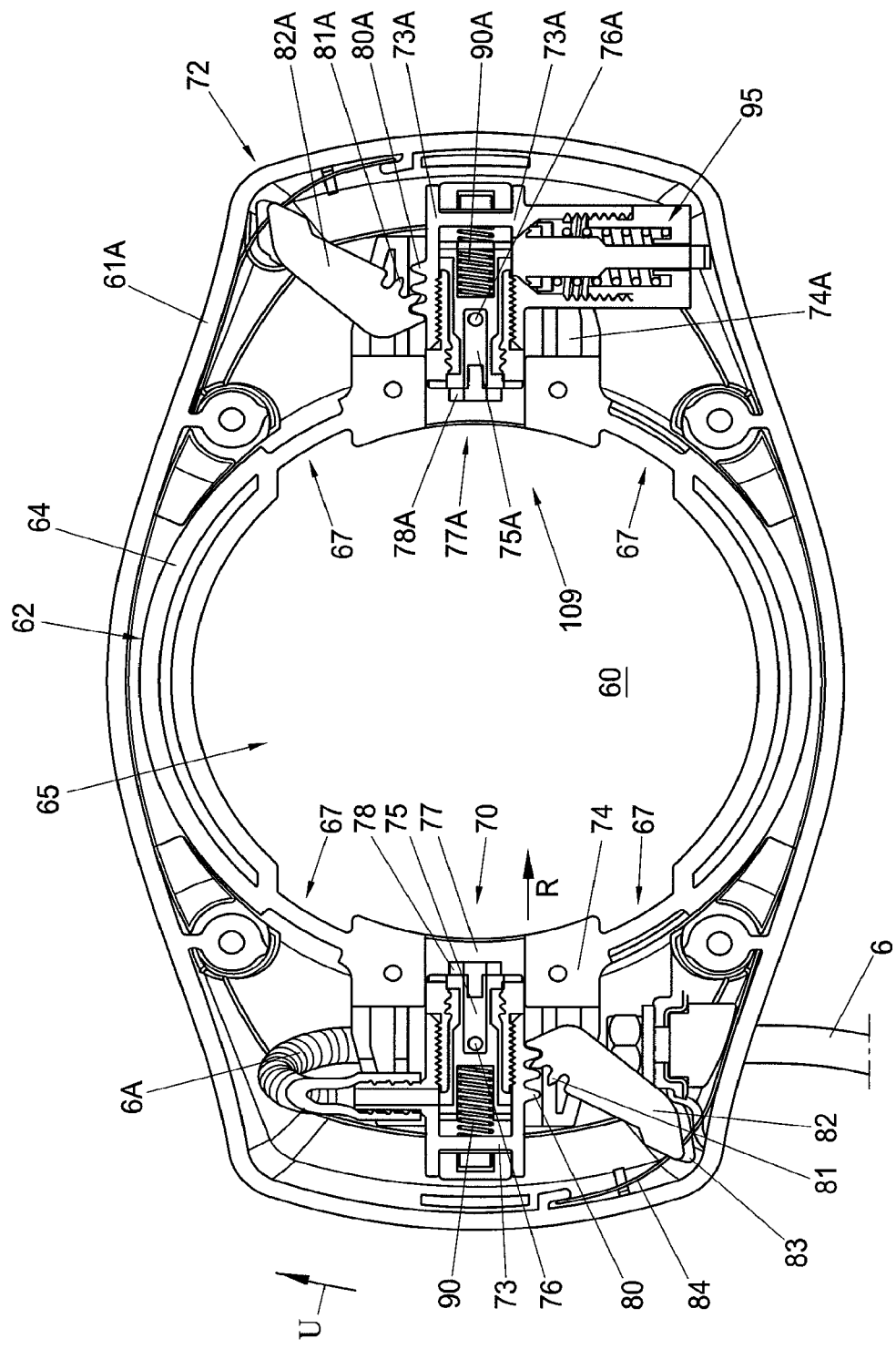
Figure 10A:
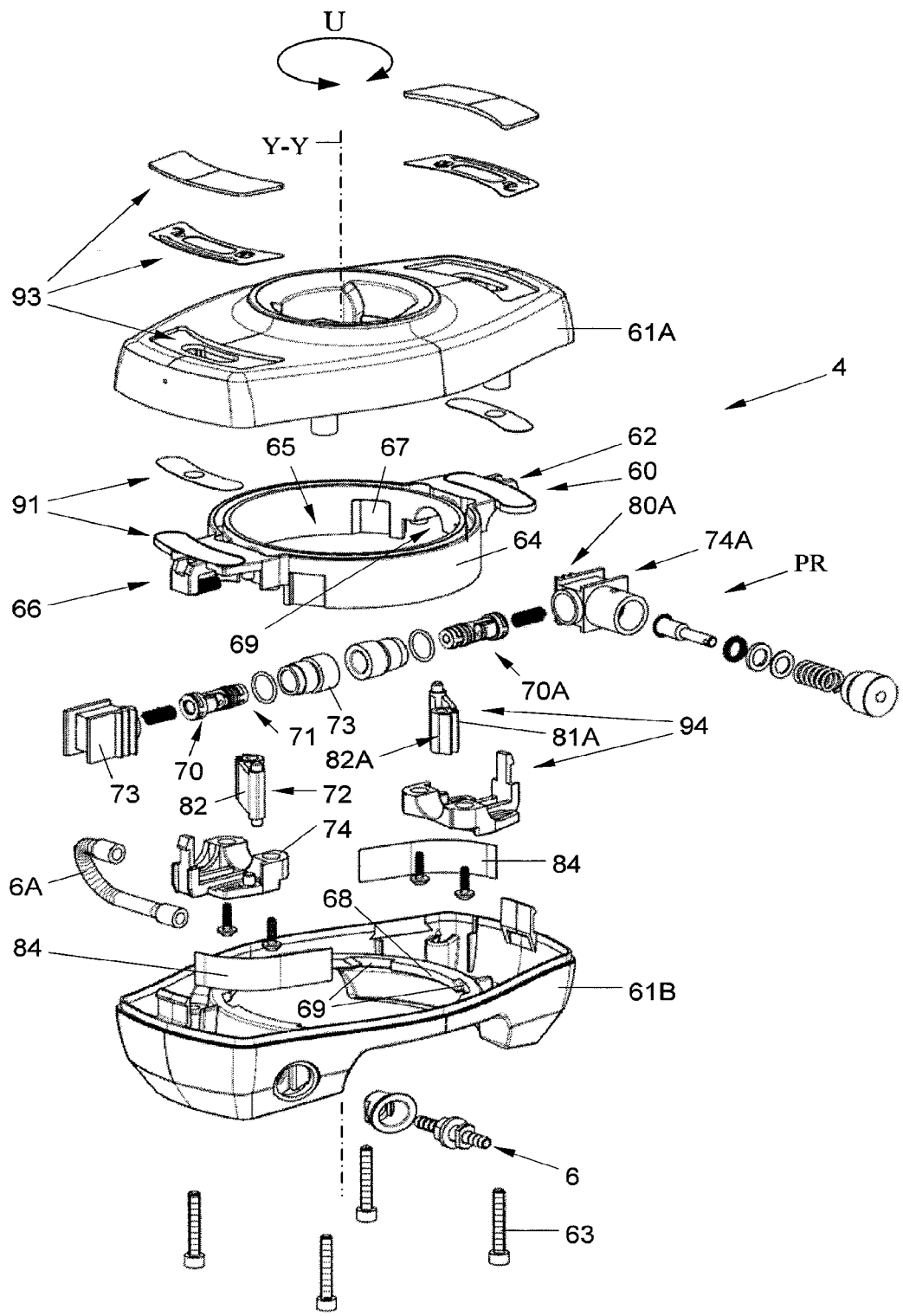
Figure 10B:
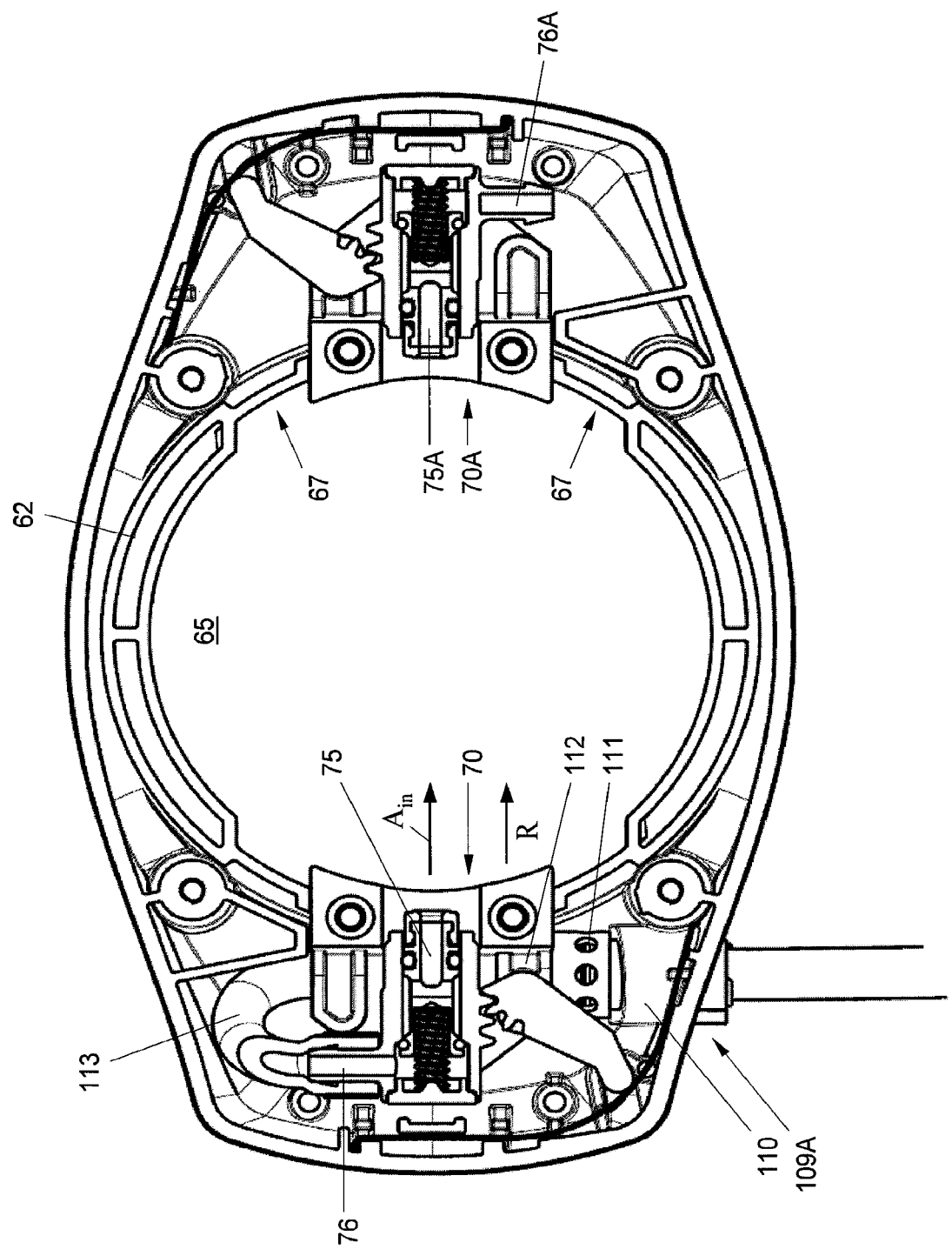
Figure 10C:
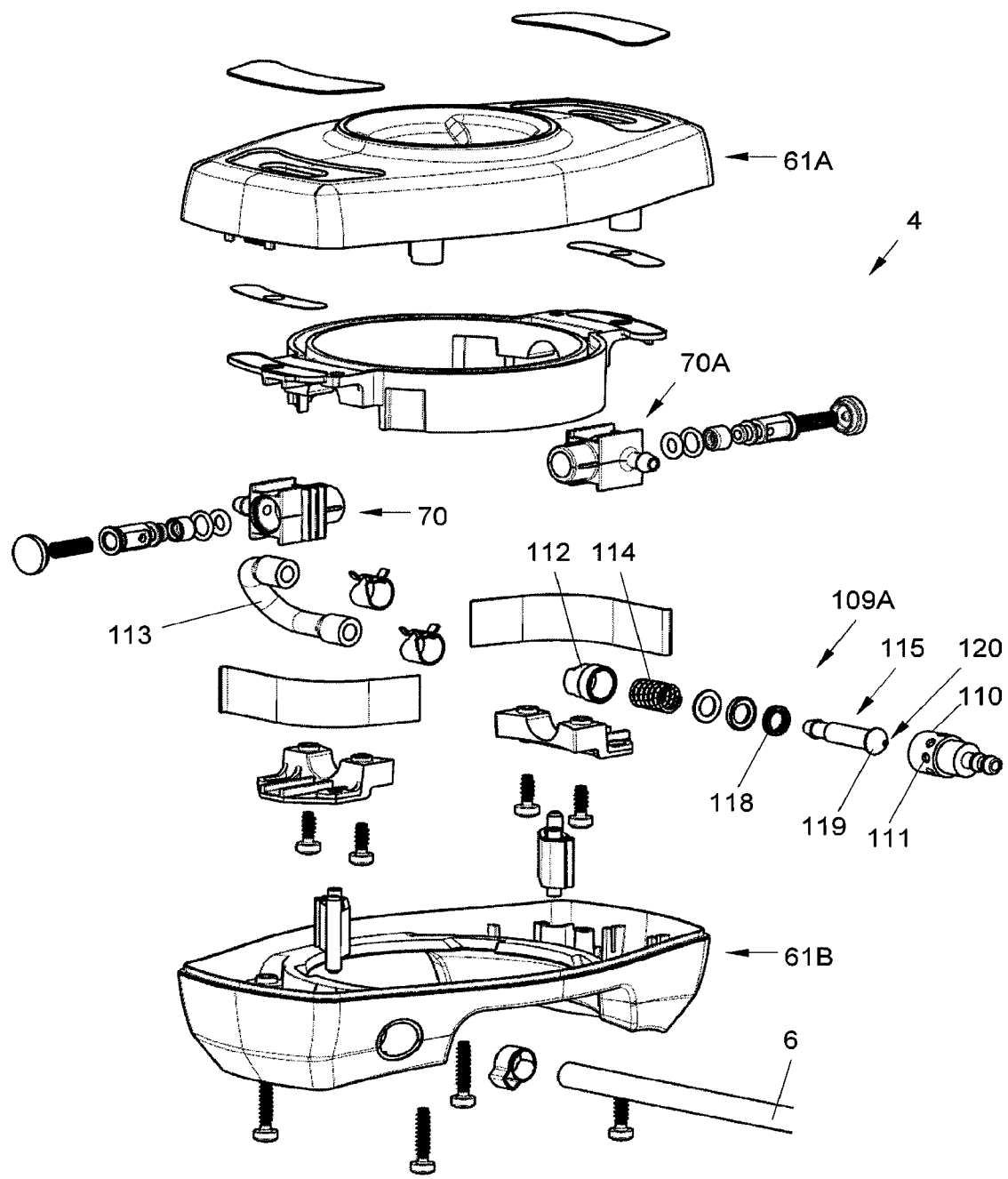
Figure 11A:
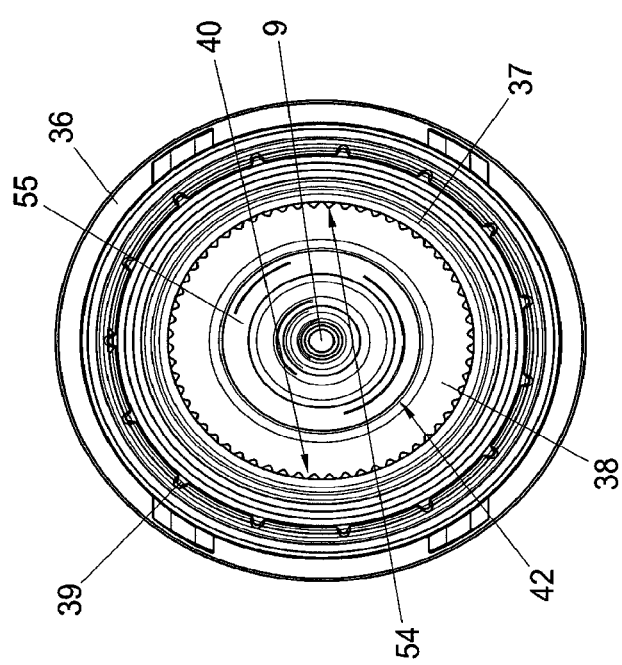
Figure 11B:
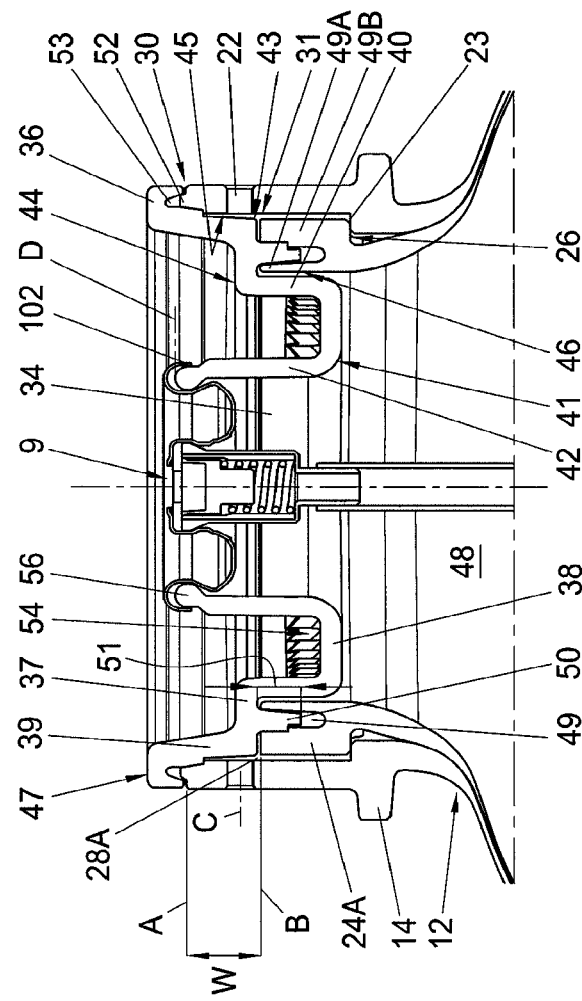
Figure 11C:
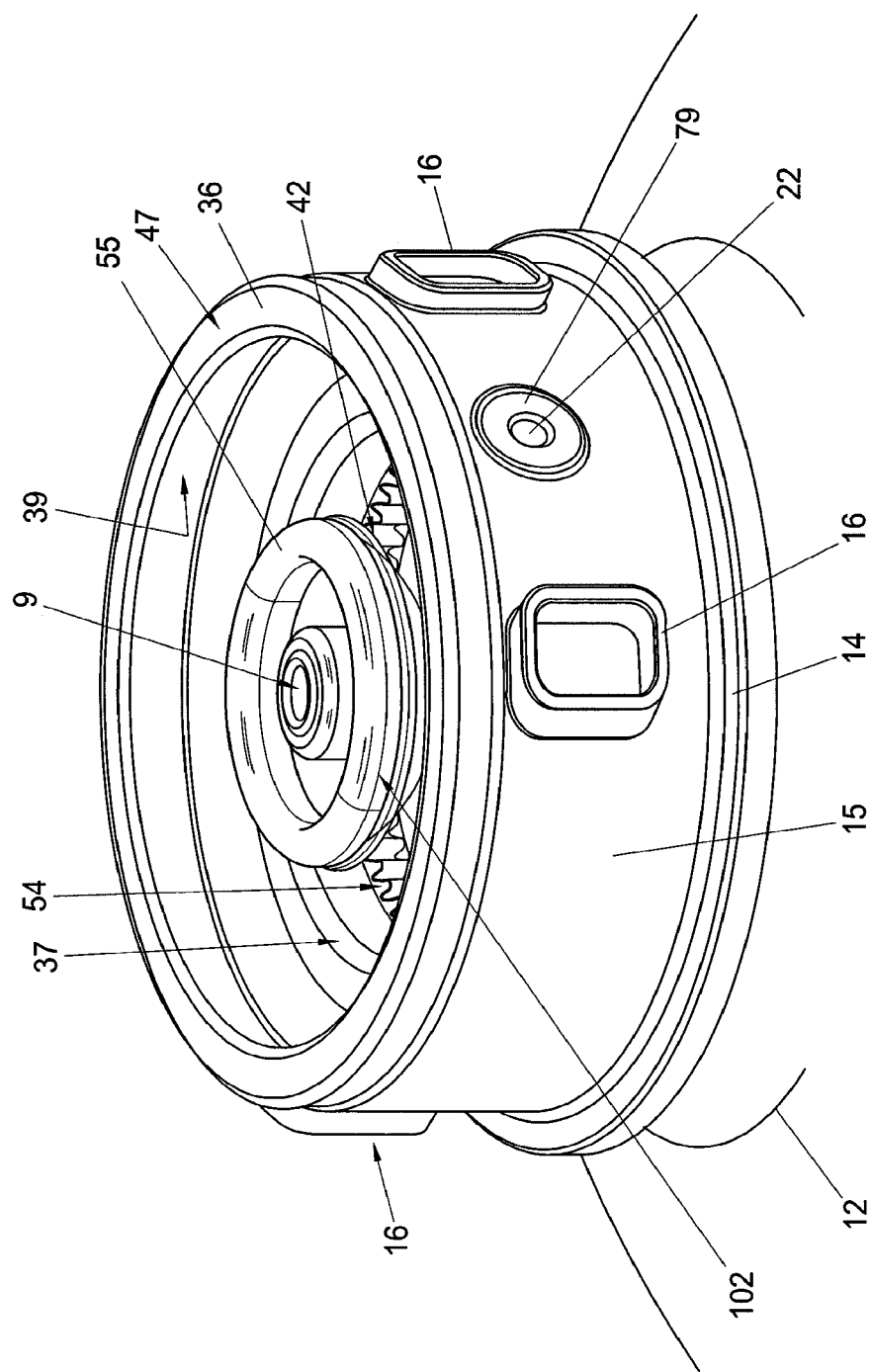
Figure 12:
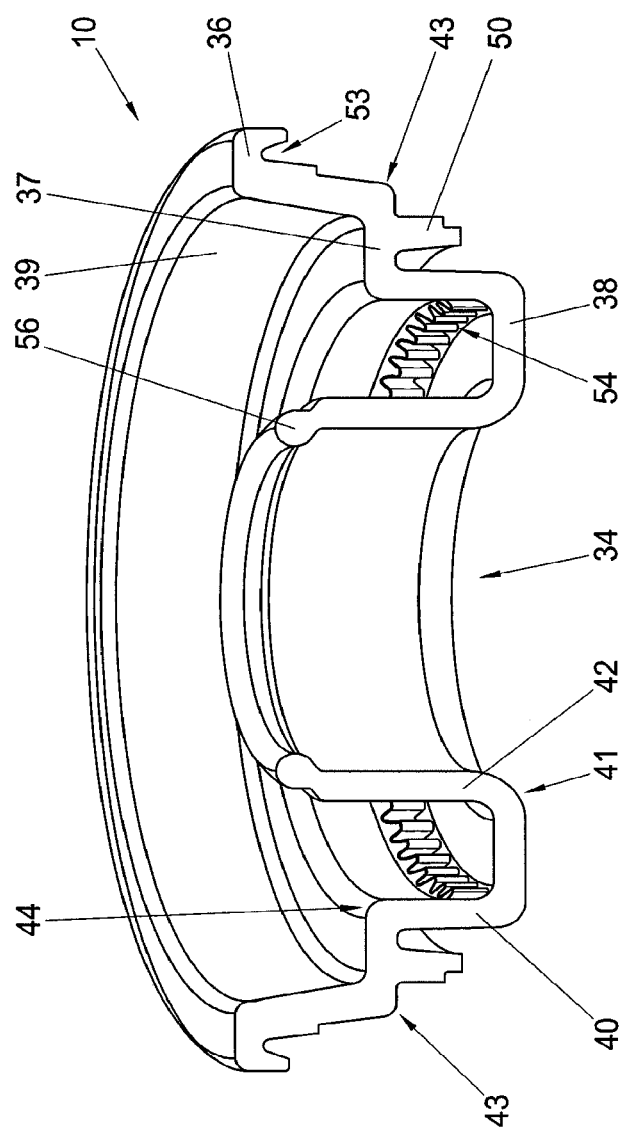
Figure 13:
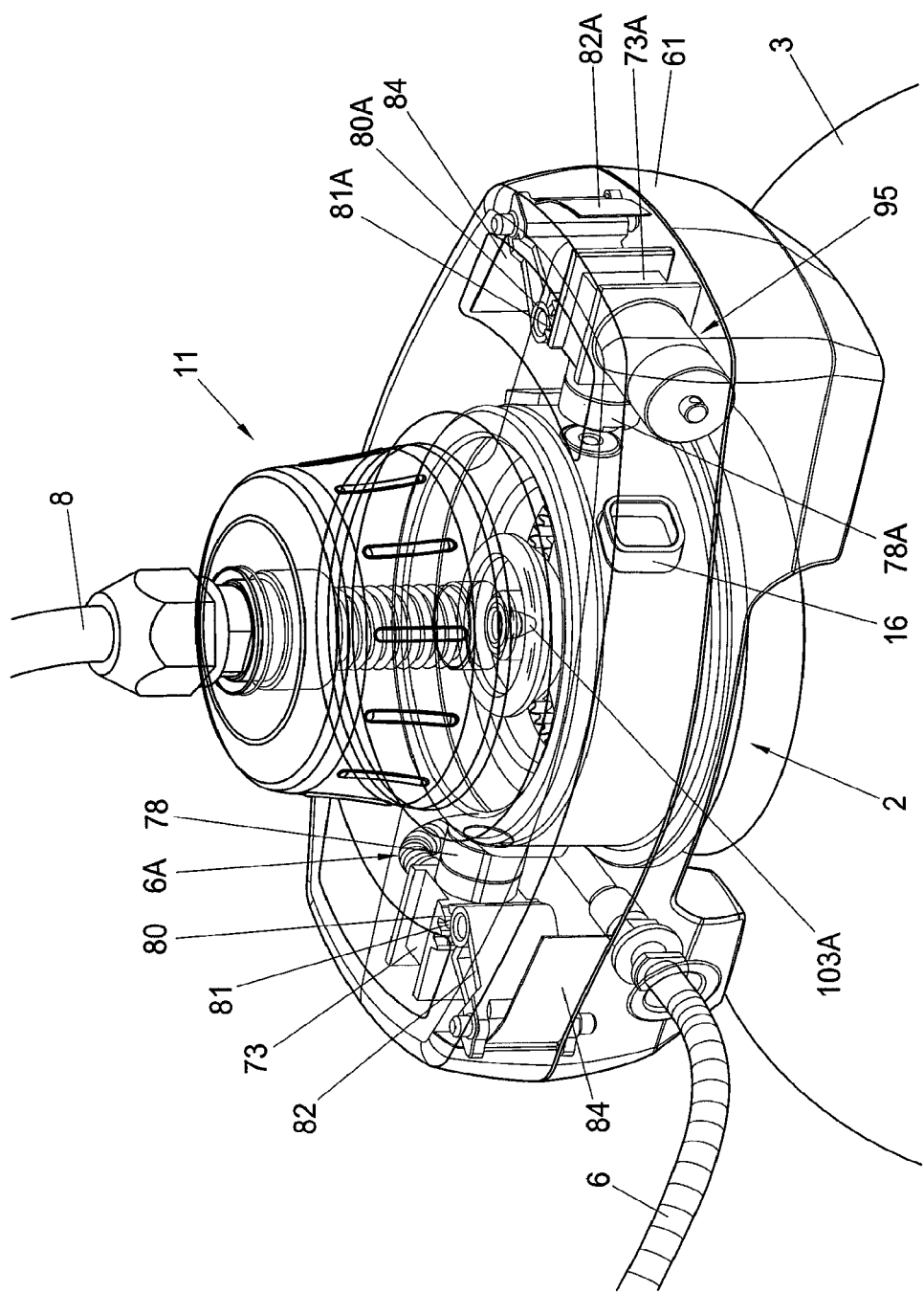
Figure 14A:
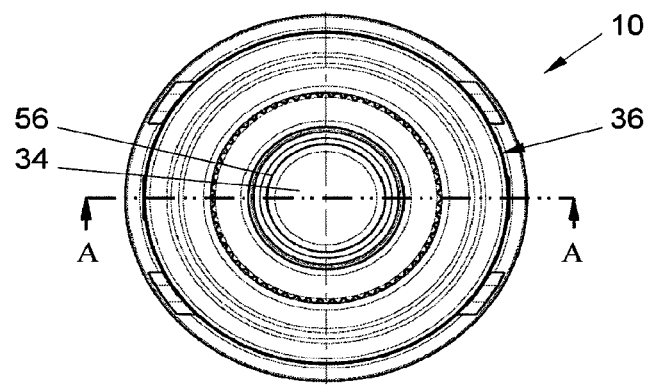
Figure 14B:
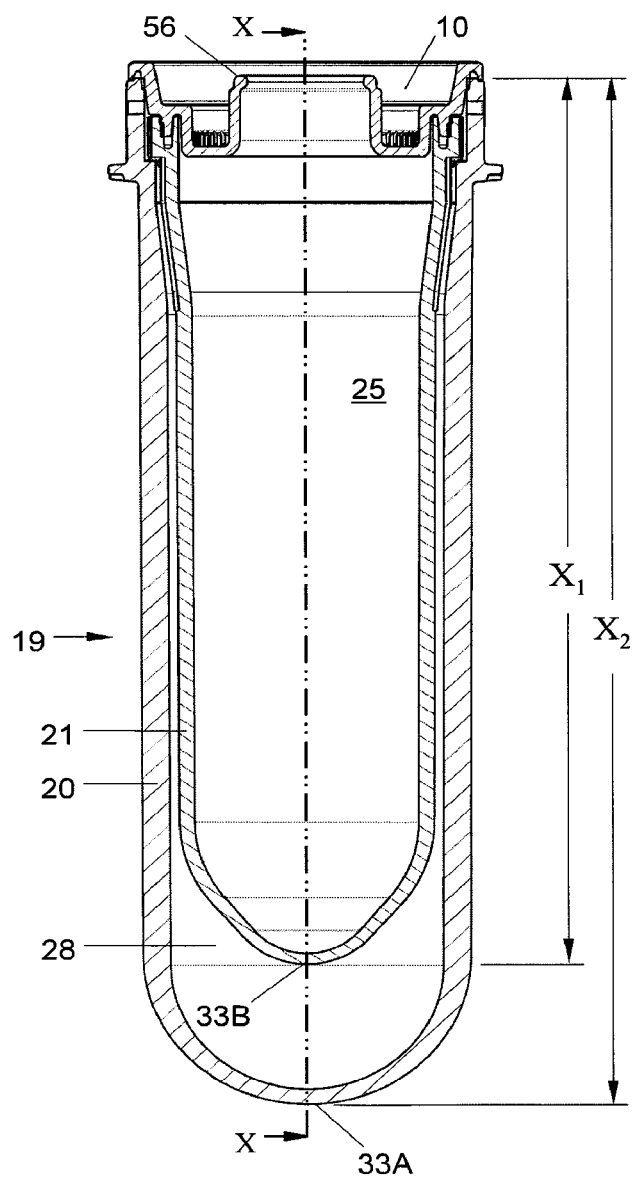
Figure 14C:
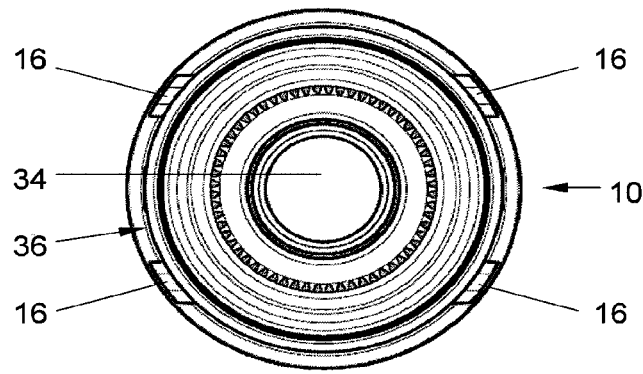
Figure 14D:
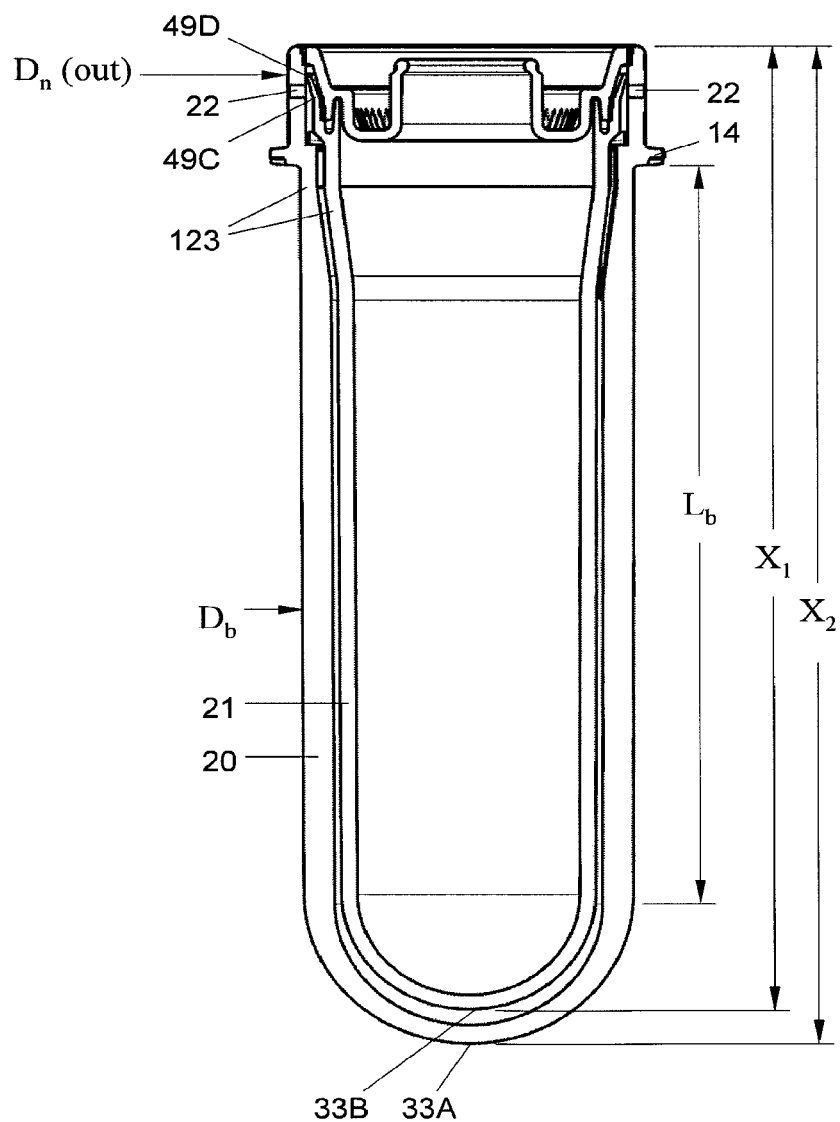
Figure 15:
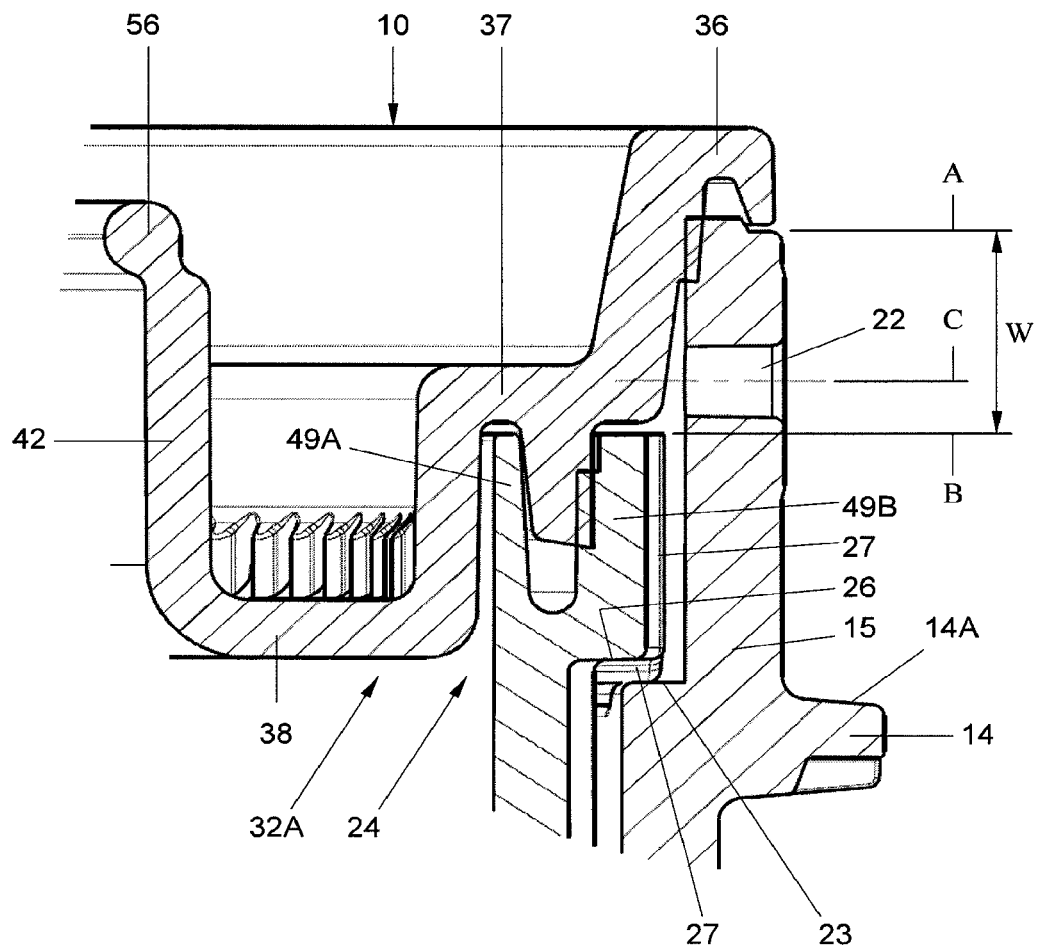
Figure 15A:
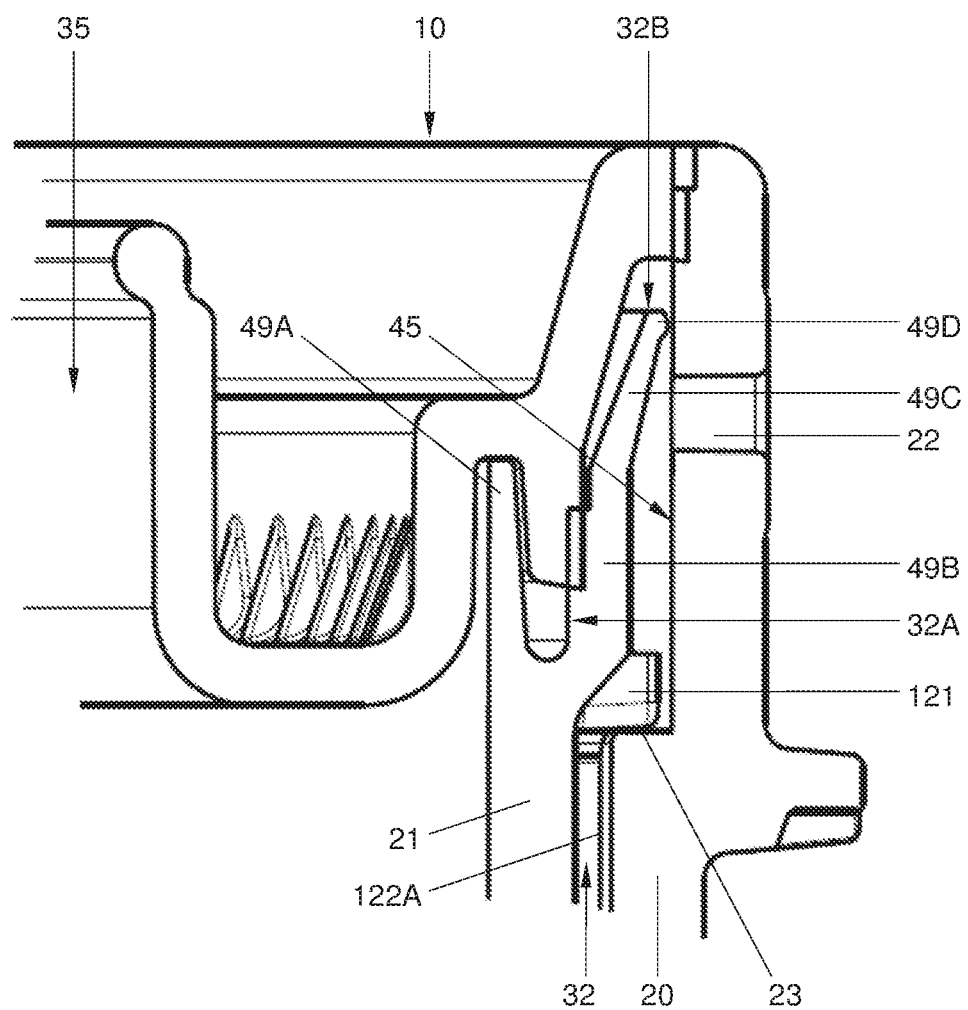
Figure 16:
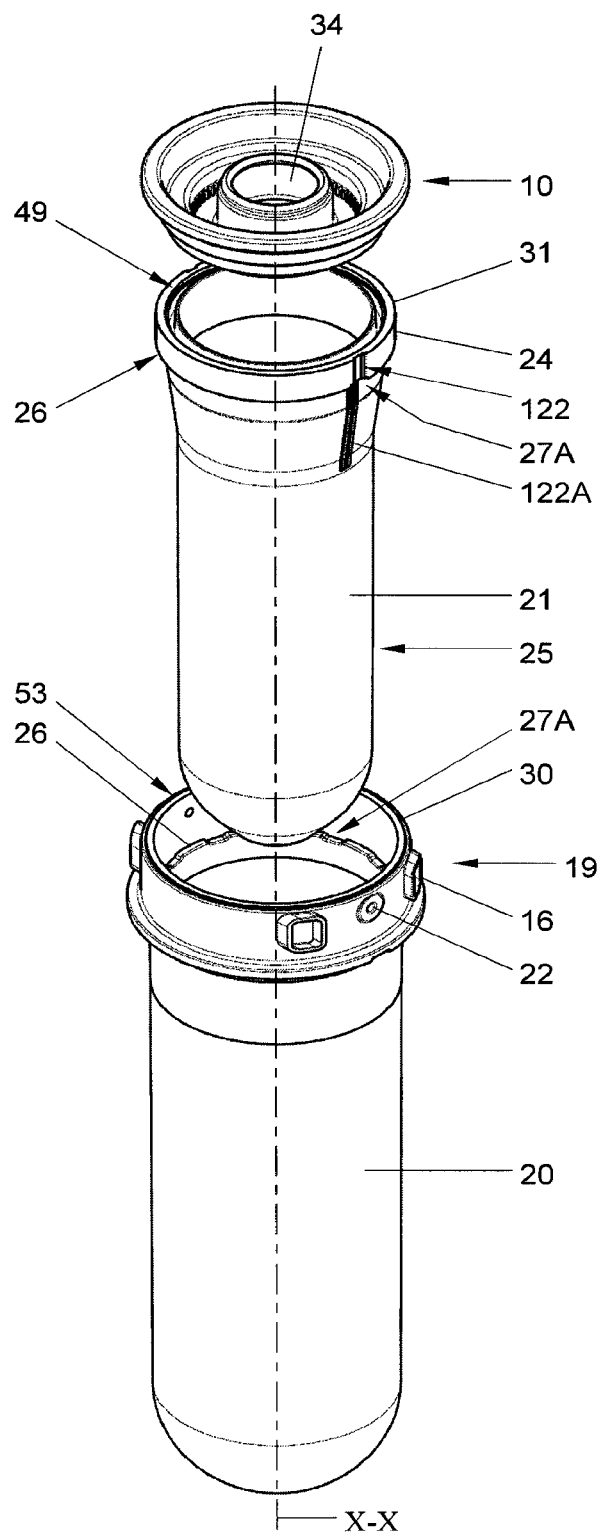
Figure 16A:
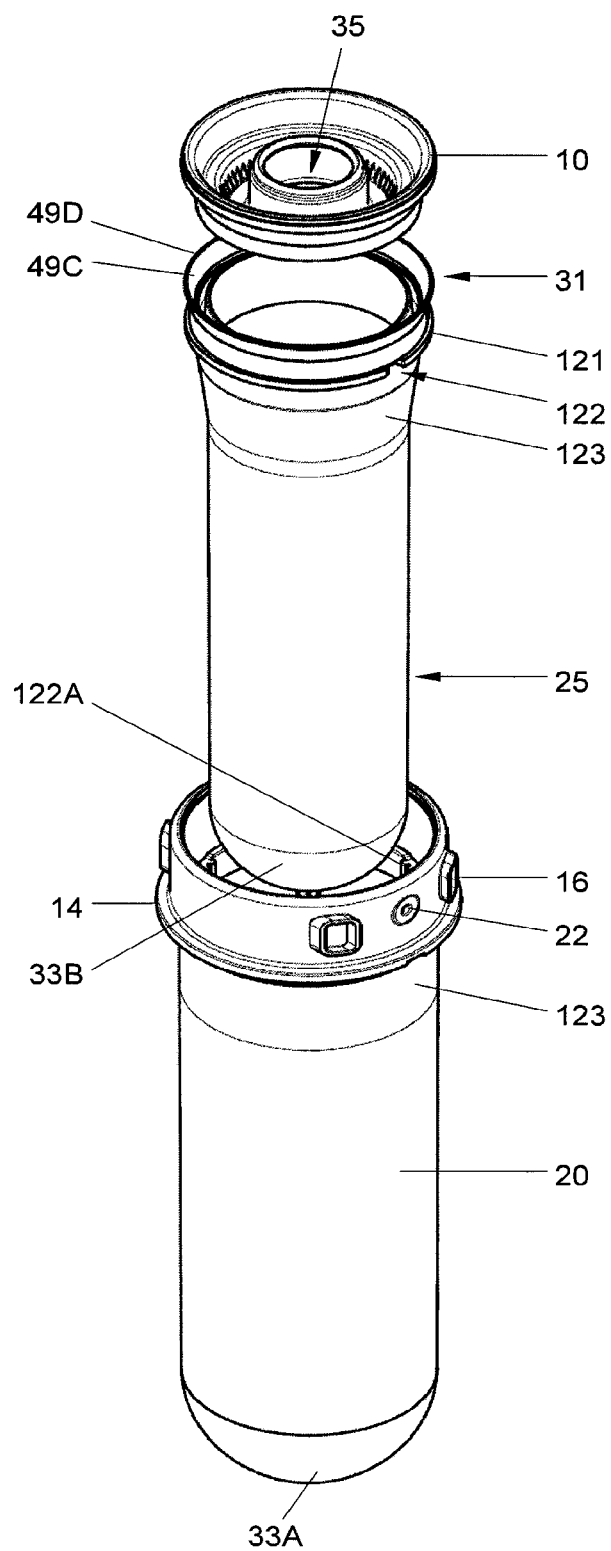
Figure 17:
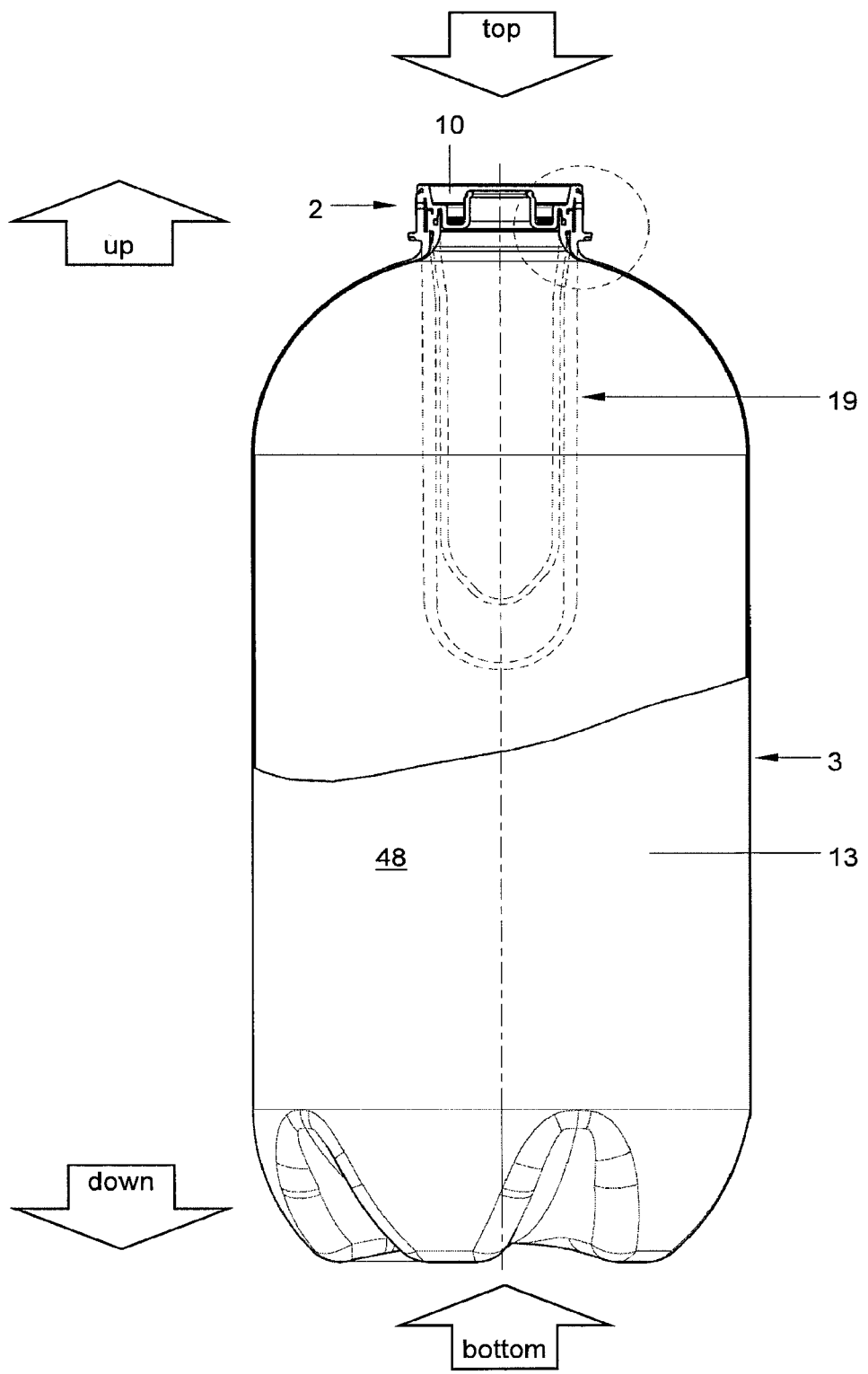
Figure 17A:
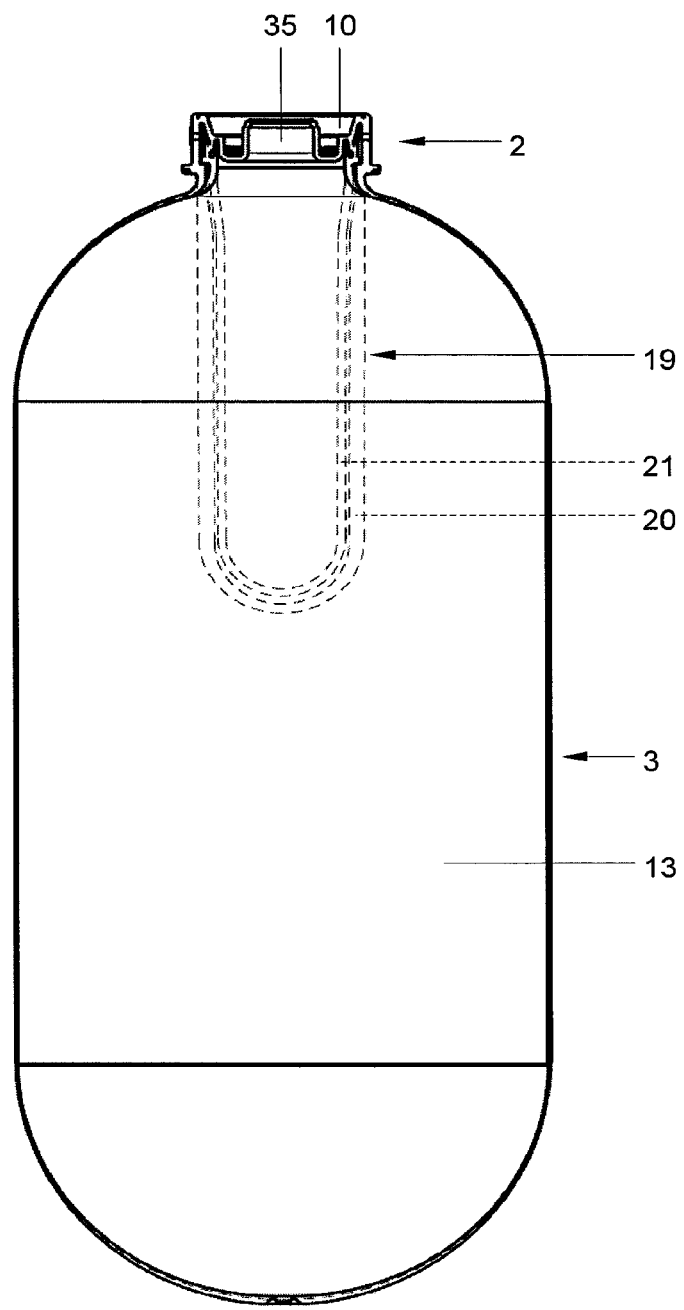
Figure 18:
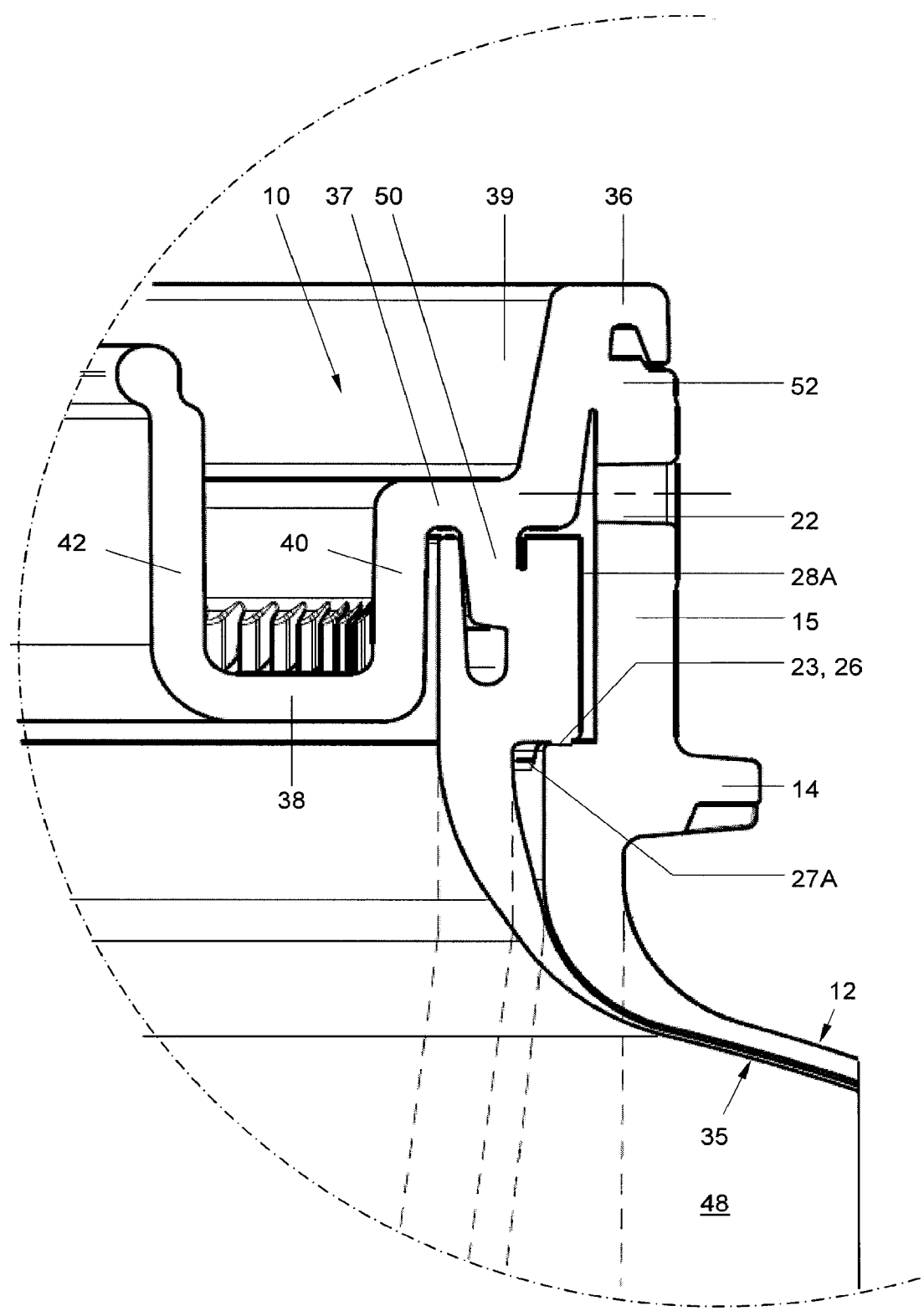
Figure 18A:
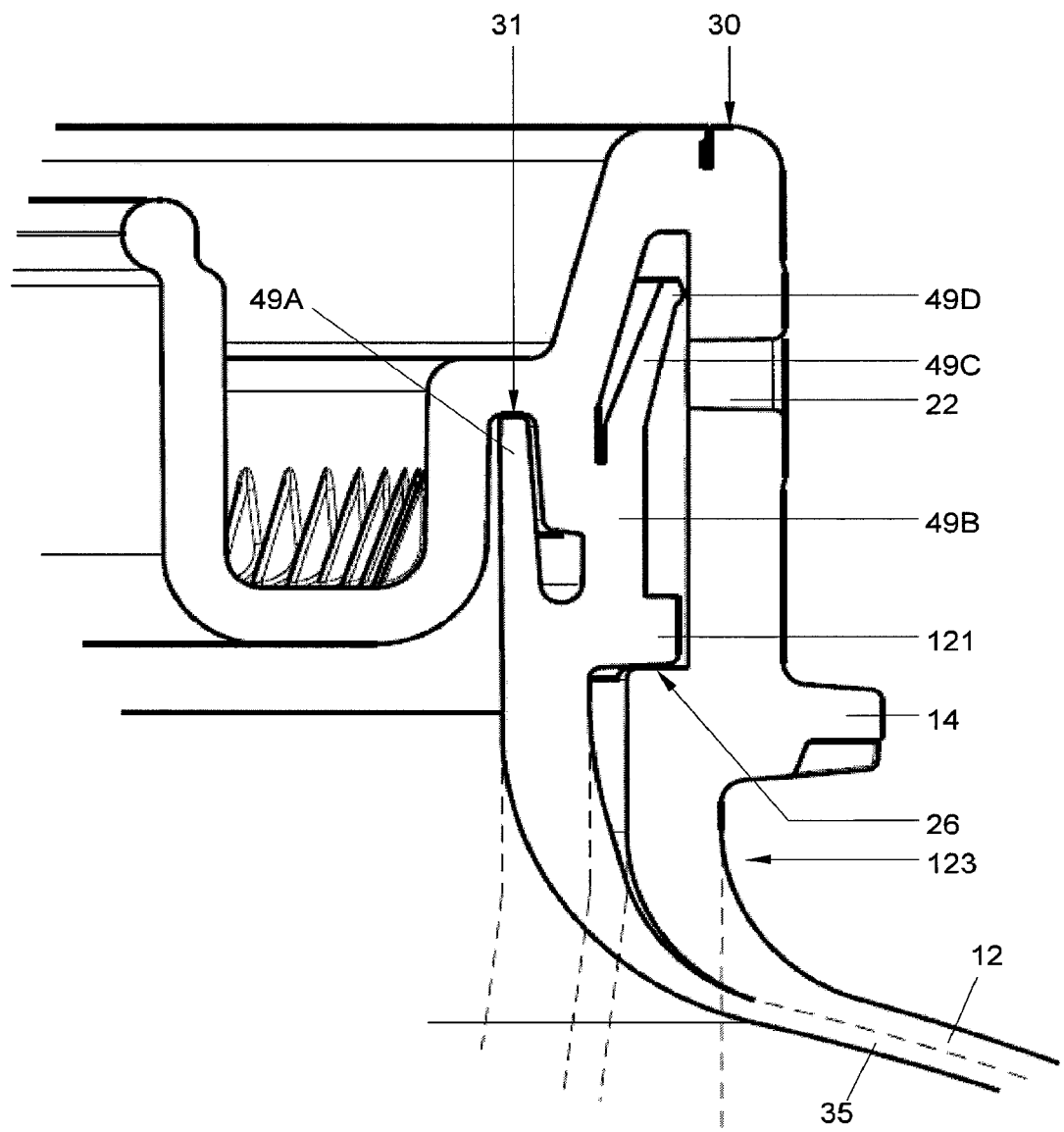

In order to further elucidate the present invention, embodiments thereof shall be disclosed and discussed hereafter, with reference to the drawings. Therein shows:

FIG. 1 in side view part of an assembly according to the disclosure, showing a neck region of a container with a connecting device, in a first embodiment;

FIG. 2 in side view part of an assembly according to the disclosure, showing a neck region of a container with a connecting device, in a second embodiment;

FIG. 3 in perspective view the embodiment of FIG. 1;

FIG. 4 in cross sectional side view along the line IV-IV in FIG. 3 the first embodiment;

FIG. 5 in cross sectional side view along the line V-V in FIG. 3 the first embodiment;

FIG. 5A in a view according to FIG. 5 an alternative embodiment, especially of the valve and of the container, for example according to FIGS. 14 C and D and FIG. 15A, wherein the connecting device has been rotated such that the connecting elements are in engagement with the container;

FIG. 6 in perspective view the embodiment of FIG. 2;

FIG. 7 in cross sectional side view along the line VII-VII in FIG. 6 the second embodiment;

FIG. 8 in cross sectional side view along the line VIII-VIII in FIG. 6 the second embodiment;

FIG. 9 a gas connecting unit of a connecting device, in perspective view, from a top and a bottom side;

FIG. 10 a cross sectional view of the gas connecting unit, taken along the line X-X in FIG. 1;

FIG. 10A in exploded view a gas connecting unit;

FIGS. 10B and 10C a cross sectional view of the gas connecting unit, taken along the line X-X in FIG. 1, and in exploded view, in an alternative embodiment;

FIG. 11A-C a neck region of a container, in top view, cross sectional view and perspective view respectively;

FIG. 12 a cross sectional perspective view of a closure ring;

FIG. 13 in partly transparent perspective view a connecting device coupled to a neck region of a container;

FIGS. 14A and B in top view and in cross sectional view along the line A-A a preform assembly;

FIGS. 14C and D in top view and in cross sectional view along the line A-A an alternative preform assembly;

FIG. 15 a detail of part of the preform assembly of FIGS. 14A and B, in cross section, showing a closure ring mounted to the preforms;

FIG. 15A a detail of part of the preform assembly of FIGS. 14C and D, in cross section, showing a closure ring mounted to the preforms;

FIG. 16 an exploded view of a preform assembly according to FIGS. 14A, B and 15;

FIG. 16A an exploded view of a preform assembly according to FIGS. 14C, D and 15A;

FIGS. 17 and 17A a container, within in phantom lines showing the preform assembly from which the container is blow moulded;

FIG. 18 a detail in cross section of the neck region, comparable to FIG. 15;

FIG. 18A a detail in cross section of the neck region, comparable to FIG. 11A.

Figure 19A:
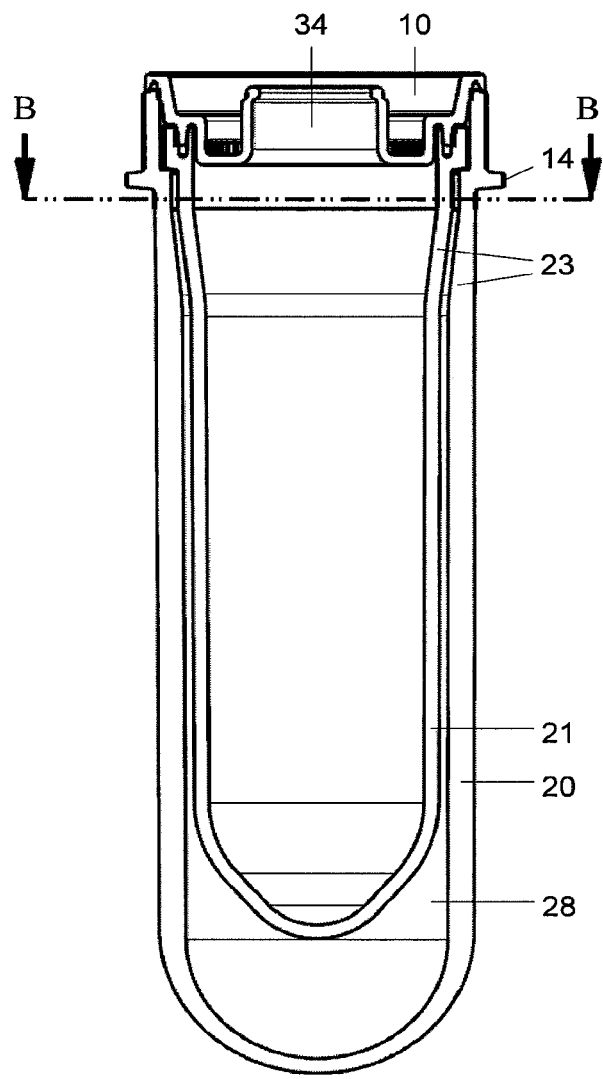
Figure 20A:
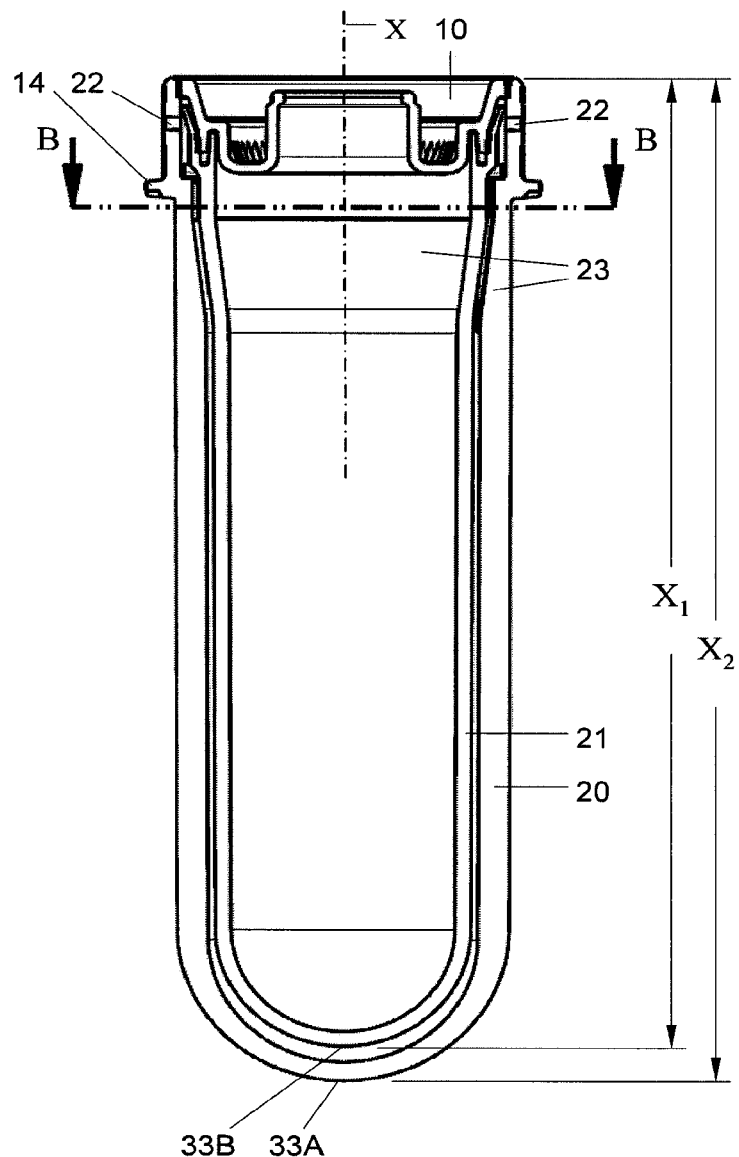

FIGS. 19 A and B an embodiment of a pre-form set, assembled and preassembling respectively;

FIGS. 19C and D a cross sectional view of the assembly according to line B-B in FIG. 19A and a detail of FIG. 19C respectively;

FIGS. 20A and B another embodiment of a pre-form set, assembled and preassembling respectively;

FIGS. 20C and D a cross sectional view of the assembly according to line B-B in FIG. 20A and a detail of FIG. 20C respectively;

In this description embodiments are shown and disclosed of the invention, by way of example only. These should by no means be interpreted or understood as limiting the scope of the present invention in any way. In this description the same or similar elements are indicated by the same or similar reference signs. In this description embodiments of the present invention shall be discussed with reference to carbonated beverages, especially beer. However, other beverages could also be used in the present invention.

In this description references to above and below, top and bottom and the like shall be considered, unless specifically stipulated differently, to a normal orientation of a container standing on a bottom part and having a neck region comprising an orifice for filling and/or dispensing facing substantially upward. This is for example shown in the drawings, especially FIG. 17, wherein top, bottom, up and down are indicated by arrows and appropriate wording, for indicative purposes only. This does not necessarily reflect the orientation in which a tapping device of the present disclosure or parts thereof have to be used.

In this description a bag-in-container has to be understood as meaning at least a container comprising an outer holder and an inner holder, wherein the inner holder is designed to hold a beverage and is more flexible or compressible than the outer holder. The outer holder can for example be a container, such as a bottle shaped container with a neck and a body, a box shaped holder or the like, whereas the inner holder can be a flexible container, such as a bag. The inner and/or outer holder can be made of mono materials or blends, can be made entirely or partly by injection moulding and/or blow moulding, rotation moulding or the like. Preferably a bag-in-container according to the invention is made by integrally blow moulding. In embodiments the bag-in-container can be made by inserting at least one preform into another preform and then blow moulding them together into a bag-in-container type container. In embodiments the bag-in-container can be made by over-moulding at least one preform forming a multi layered preform and then blow moulding them together into a bag-in-container type container. In embodiments a bag can be suspended inside an outer container, after forming the outer container and the bag separately, at least in part.

In the present disclosure by way of example a bag in container (BIC) shall be described, integrally blow moulded from a preform set comprising two plastic preforms, super imposed, which should be understood as meaning that one of the preforms is inserted into the other, after which they are together blow moulded in a known manner into a BIC. In embodiments prior to said blow moulding a closure ring is fitted over the preforms, connecting them together and closing off the space, which can also be referred to as interface or inter space, between the preforms, such that at least after blow moulding said space is or can be in communication with the environment only through one or more openings provided in a neck region of the container, especially an outward opening, extending through a wall of the neck region of the outer preform and/or container. The said at least one opening can be provided during manufacturing the preforms, especially during injection moulding thereof, but could also be provided later, for example by punching, drilling or otherwise machining. In embodiments the ring can be provided as an integral part of one of the preforms.

In this description a tapping assembly shall be described, comprising at least a connecting device, a container, especially a bag in container (BIC) type container and a tap or such device to which the container is to be coupled, as well as a source of pressurised gas, such as air. The tap and source of gas shall not be discussed explicitly, since these are commonly known in the art. In advantageous embodiments as a gas to be introduced into the container air can be used, for example pressurised by a compressor, connected to the connecting device by a gas line, especially an air hose. As pressure fluidum other gasses can however be used, such as $CO_2$, or another fluidum, such as water. The fluidum can be supplied in any suitable way, as is known in the art. As a tap any fixed or mobile tap can be used, depending on for example the tapping line used. In embodiments the tapping line can be a replaceable tapping line, especially a disposable tapping line, as for example used in Heineken's David® system, as for example disclosed in EP1289874 or US2004226967, in which case a tap can be used to which the tapping line can be releasably coupled, for example by an in-line valve or by forming a valve assembly of the hose valve type, or by a quick coupling type coupling. In other embodiments the tapping line used can be a fixed tapping line of a beverage dispense system. Both types of systems are well known in the art and shall not be further discussed.

FIG. 1 shows in a side view part of a first embodiment of a tapping assembly 1, showing a neck region 2 of a container 3, a gas connecting unit 4 of a connecting device 5, connected to a gas line 6, such as an air line or air hose, and a connector 7 connected to a tapping line 8, especially a flexible tapping line. As will be discussed the gas connecting unit 4 can be connected to the neck region 2, whereas the connector 7 can be coupled to or at least over a valve 9 mounted in a closure ring 10 of the container 3. The container is a bag-in-container type container 3.

FIG. 2 shows in a side view part of a second embodiment of a tapping assembly 1, showing a neck region 2 of a container 3, a gas connecting unit 4 of a connecting device 5, connected to a gas line 6, such as an air line or air hose, and a connector 11 connected to a tapping line 8, especially a flexible tapping line. As will be discussed the gas connecting unit 4 can be connected to the neck region 2, whereas the connector 1 can be coupled to the gas unit 4, in a position over a valve 9 mounted in a closure ring 10 of the container 3. The container is a bag-in-container type container 3.

Alternative to the embodiment of FIG. 2 the connector 11 could also be integral to the connecting device 5. In such embodiment preferably the tapping line 8 is provided with a valve spaced apart from or in the connector 11 for closing off the tapping line 8, such that when connecting the connecting device 5 to the container 3 and thereby opening the valve 9 as will be discussed, beverage will not flow out of the tapping line 8 unintended. Such valve can for example be as disclosed in EP1289874 or US2004226967, and as discussed here above.

In the embodiments of FIGS. 1 and 2 the container 3 and the unit 4 can be the same, whereas the connectors 7 and 11 can be different, the connector 7 of the first embodiment being designed basically for single use, i.e. for use with one container only, disposable with the tapping line 8, although it could be reusable for different containers, whereas in the second embodiment the connector 11 is designed basically for repeated use, i.e. for use with a series of different containers 3. A connecting device according to this description can therefore comprise an air unit 4 and, depending on the intended use, either one or both of the connectors 7, 11. The connector 7 of the first assembly could be provided with and/or could be discarded with the container 3, such that for each subsequent container 3 a new connector 7 is used.

In FIGS. 1 and 2 schematically a tapping device 200 is shown, to which the tapping line 8 is connected in a known and suitable manner, such that when operating a tapping handle 201 of the tapping device 200, beverage from the container 3 can flow through the tapping line 8 and out of the tapping device 200.

Embodiments of the air unit 4 and container 3 shall be discussed in general, whereas the connectors shall be described with specific references to the relevant figures.

As can be seen in FIGS. 1 and 2 the container 3 can have an outer container 12 with a body 13, of which a shoulder portion is visible in FIGS. 1-8, having a substantially cylindrical neck 15 forming part of the neck region 2. The neck comprises a ring shaped flange 14 as is common in the art and can for example be used for engaging the preform from which the container is formed as well as the container during manufacturing, filling and/or further handling, whereas the flange 14 can also increase the rigidity of the neck 15. The neck 15 is further provided with a number of coupling elements 16, preferably above the flange 14, which can cooperate with compatible coupling provisions 17 of the gas unit 4, as will be explained hereafter. The coupling elements 16 and provisions can together form a bayonet type coupling assembly.

In FIG. 11 a neck region 2 of a container 3 is shown, whereas FIGS. 14-18 show a preform assembly 19 that can be used for forming such container as well as a container 3 as such.

The preform assembly 19 comprises an outer preform 20 and an inner preform 21, which is inserted into the outer preform 20. Both preforms 20, 21 are in the embodiment shown basically rotational symmetrical around a longitudinal axis X-X, though openings 22 as will be discussed can be provided in discrete positions. Other shapes and dimensions would be possible too. The outer preform will, when blow moulded, form the outer container 12, whereas the inner preform 21 will by blow moulding form an inner container 35, which will be more flexible than the outer container 12 and may for example be a bag or balloon or such container.

The outer preform 20 has a neck or neck region 15, as indicated before, which on the inside is provided with a shoulder 23, for example at a longitudinal level substantially the same as an upper face 14A of the flange 14. The inner preform 21 has a neck or neck region 24, which is wider than a body forming portion 25 thereof, such that a shoulder 26 is formed which can rest on the shoulder 23 of the outer preform 20. Thus an insertion depth is defined. As can be seen the shoulder 26 and the neck 24 of the inner preform 21 can be provided with spacer elements 27, such as teeth, channels or the like, such that at least at different peripheral positions gaps are maintained between the preforms at the neck and shoulder regions, in order to prevent them from close contact, since such close contact could seal off the shoulders 23, 26 and necks 15, 24 or at least substantially prevent gas such as air passing the shoulders 23, 26 into the body 32 of the container, between outer and inner containers 12, 35.

In the embodiment shown the spacer elements 27 can comprise a flange or ridge 121 extending outward from the outer surface of the neck region of the inner preform 21, for example approximately at a level of the lower end of or just below the outer wall part 49B of the groove 49, which has an outer diameter only slightly smaller than the inner diameter of the neck of the outer preform at the same level. This flange or ridge 121 thus can form at least part of a shoulder 26 for resting on the shoulder 23 in the outer preform 20. The flange or ridge 121 comprises at least one and preferably a number of cut-troughs 122. As is shown in FIG. 16 this or these cut-troughs 122 can each be in communication with a channel 122A extending in an outer face of the inner preform and/or in an inner face of the outer preform, extending over at least part of a shoulder forming part 123 thereof. Upon blow moulding the BIC integrally from the preforms 20, 21 the shoulder forming part 123 will be expanded in radial and tangential direction, for forming a shoulder of the inner and outer containers. The cut troughs 122 and the channels 122A will remain open, even though the channels 122A will deform slightly, such that a clear passage for pressurised gas is obtained or maintained from the at least one opening 22 into the space 32 between the body forming portions of the inner and outer containers. As can for example be seen in FIGS. 15 and 18 the neck 24 of the inner preform 21 and the neck 15 of the outer preform 20 and/or outer and inner containers 12, 35 are connected to a closure ring 10, such that an air tight connection is provided between the neck 26 and the ring 10 and between the neck 15 and the ring 10. The ring 10 thus closes off the upper end of the space or interface 28 between the outer and inner preform 20, 21 or containers 12, 35 formed there from.

In the embodiments shown the ring 10 is mounted on the free ends 30, 31 of the respective necks 15, 26 of the outer 20 and inner preform 21 or containers 12, 35. The free ends 30, 31 are formed at a side of the respective necks 15, 26 at a side remote from the body 32 of the container 3. These free ends 30, 31 are positioned at first and second longitudinal levels A and B. Each level A, B can for example be represented as a plane substantially perpendicular to the longitudinal axis X-X. The levels A and B can coincide, but in the embodiment shown the level A at which the free end 30 of the outer preform 20 or outer container 12 lies is positioned at a higher longitudinal level A, that is further from the body 32 of the container 3 than the level B at which the free end 31 of the inner preform 21 or container 35 formed therefore, which may be a bag, is positioned.

In the embodiment shown in FIG. 14B the inner preform 21 can have longitudinal length $X_1$ which is substantially smaller than the longitudinal length $X_2$ of the outer preform 20, such that a substantial open area is formed between bottom portions 33A, 33B of the inner 20 and outer preform 21. This means that the outer longitudinal length of the inner container below the neck region, including the bottom forming portion, is considerably smaller than the inner longitudinal length of the outer container below the neck forming portion. Thus when blow moulding the preforms into a container, the inner preform 21 is likely to be stretched longitudinally first, before the outer preform is stretched as well, which can mean that the wall thickness of the body forming portion 28 of the inner container 35 or bag formed is reduced more significantly than the wall thickness of the outer container 12 when stretched. Moreover this may lead to different material properties of the inner and outer containers formed, even if the same material is used. The same material should be understood as at least meaning the same type of plastic, even if they are different grades of such plastic, or the same blends of plastics, wherein blends are at least considered the same within the context of this application when they contain substantially the same plastic materials in substantially the same weight percentages. Substantially the same should be understood in this context as at least meaning within 10% differences in weight ratios, wherein substantially the same plastics should be understood as meaning that they should comprise the same plastics, even if they are different grades, whereas if they contain different plastics, the amount of difference may by weight ratio not exceed 10 percent of the total weight of the preforms or containers. In embodiments the inner and outer preform may be made of different plastic materials. Release agents or the like may be provided between the preforms and/or parts thereof. A substantial open area should be understood as meaning that the area is seen in the longitudinal length direction of the preforms larger than strictly necessary for accommodating fabrication tolerances of the injection moulded preforms and possibly a stub formed at the bottom portion 33B of the inner preform, which is due to the injection point of the preform being present centrally at said bottom portion 33B. By way of example only, $(X2-X1)/X2$ could be in a range of for example between 0.1 and 0.3.

In the embodiment of FIG. 14D the lengths X1 and X2 of the inner and outer preforms 21, 20 are chosen such that the bottom portion 33B of the inner preform 21 is close, preferably as close as possible to the bottom portion 33A of the outer preform 20 as physically possible, taking into account normal production tolerances for the preforms and alignment of the preforms relative to each other and for accommodating the stub resulting from the injection point of the inner preform 21. This can be understood that said lengths are a close to being equal as allowable. In embodiments this means that the difference in length X2 and X1 would be in the order of a few millimetres. The difference in length is preferably sufficient to allow relative rotation of the inner preform and the outer preform during spin welding steps. By way of example, which should not be understood as limiting the scope of the disclosure in any way, for a BIC having an internal volume for beverage of between 15 and 20 litres, the difference in length X2 and X1 could be less than 5 mm, for example less than 4 mm, at a total outer length of the outer preform 20 of for example about 250 mm. The relation (X2−X1)/X2 can be in the order of less than 0.1, for example about 0.05 or less. By making the preforms 20, 21 substantially of the same length, the stretch ratios of the preforms 20, 21 during blow moulding them together into a BIC will be better controlled and more optimal for the material properties of both the inner and outer container. For example the inner container will be prevented from being over stretched. Over stretching the inner container could be detrimental to its strength and could make the inner container prone to breaking. The outer container could be prevented from being under stretched. Under stretching of the outer container could lead to a container with insufficient stability necessary for performing its functions, such as but not limited to protecting the inner container and providing for a pressure barrel in order to be able to squeeze the inner container by pressurising the space between the inner and outer container.

The plastic materials and processing parameters for especially blow moulding should be chosen such that the inner container 35 will release from the body 13 of the outer container 12 when the space 32 in between them is pressurised to a pressure sufficient to properly dispense the beverage by squeezing at least part of the body portion of the inner container. The release pressure can be understood as the difference between the pressure of the fluidum, especially gas, such as air or $CO_2$ introduced into the space 32 between the inner and outer containers and the pressure inside the inner container, for example provided by a carbonated beverage enclosed therein, such as but not limited to beer. This pressure difference preferably is relatively low, such as for example less than about 1 bar ($1·10^5$ Pa), more preferably less than 0.5 Bar ($0.5·10^5$ Pa), even more preferably less than 0.2 Bar ($0.2·10^5$ Pa). A low release pressure will have the advantage that the absolute pressure within the space 32 and therefore within the BIC can be kept relatively low, which can increase safety. For example a pressure in said space can be kept below 4 barg, more specifically less than 3 barg absolute. Preferably the outer and inner preforms 20, 21 or containers 12, 35 are not connected to each other over any substantial area within the body 32.

As can be seen in for example FIGS. 11, 15 and 18 at least one opening 22 can be provided, extending through the wall of the neck 15 of the outer container 12. In the embodiment shown there are two such openings 22, diametrically opposite each other. The opening or openings 22 is/are positioned at a longitudinal level C between the levels A and B. i.e. above the flange 14 and below the free end 30 of the outer preform 20 or container 12.

In embodiments the free ends 30, 31 are spaced apart over a longitudinal distance W. The closure ring 10, as is shown for example in FIGS. 11, 12, 14, 15, 15A,18, 18A, 19A-D and 20A-D in more detail, can comprise a central opening 34, opening into the inner volume of the inner preform 21 or inner container 35, and is designed to hold a valve 9 as will be discussed. The closure ring 10 can be provided with an outer, first ring shaped portion or flange 36 that can be positioned on the free end 30 of the outer preform 20 or outer container 12, an intermediate or second peripheral ring shaped flange or portion 37 that can be positioned on the free end 31 of the inner preform 21 or inner container 35, and an inner or third peripheral ring shaped flange or portion 38. The outer and intermediate portions 36, 37 are connected by a first peripheral wall 39, extending upward from an outer edge 43 of the intermediate portion 37. The intermediate and inner portions 37 and 38 are connected by a second peripheral wall 40, extending downward from an inner edge 44 of the intermediate portion 37. From an inner edge 41 of the inner portion 38 a third peripheral wall 42 extends upward, forming or at least enclosing the opening 34. The walls 39, 40 and 42 can be considered as forming substantially concentric skirts. The second and third walls 40, 42 can be substantially parallel to each other and to the longitudinal axis X-X, whereas the first wall can slope slightly outward in upward direction.

The first wall 39 preferably extends directly adjacent the inner face 45 of the neck 15 of the outer preform 20 or container 12, such that the outer edge 43 is positioned above the shoulders 23 and 26, wherein the neck portion 24A of the neck 24 between the free edge 31 and the shoulder 26 is enclosed between the said edge 43 and the shoulder 23. Preferably at least at a lower end of the first wall 39, close to the edge 43 a gap is provided between the wall 43 and the inner face 45. The second wall 40 extends preferably adjacent the inner face 46 of the neck 24 of the inner preform 21 or inner container 35. The inner portion 38 of the closure ring 10 can be positioned at the longitudinal level of the shoulder 23 and/or the flange 14. Thus the neck 24 of the inner preform 21 or container 35 is well enclosed. The third or inner wall 42 can extend from the portion 38 upward to a level D substantially the same as level A, and preferably below a top surface 47 of the first or outer portion 37. The contact surfaces between the ring 10 and the free ends 30, 31 could have any suitable shape and configuration, and may depend on for example the method of connecting. In embodiments the ring 10 can be connected to the preforms by mechanical or physical means, such as but not limited to press fitting, screw threads, bayonet coupling, glue, welding, over moulding or other suitable means. In the present disclosure especially welding is disclosed, more specifically spin welding, by way of example. Combinations of connecting techniques as discussed are also possible. The configuration discussed hereafter is not limiting but may be advantageous for welding, especially spin welding.

In the embodiment as shown in for example FIGS. 14 C and D and FIGS. 15A and 18A the ring 10 is mounted substantially entirely within the neck portion of the outer container. In this embodiment the ring 10 is not provided with the flange 36, or at least not such flange for resting on top of the neck of the outer container but is during spin welding forced into and fused with an internal portion of the neck of the outer preform 20.

In the embodiments shown the ring 10 and free ends 30, 31 of the preforms or containers form a labyrinth 32A type of connecting, which may be beneficial because it can limit or even prevent debris coming from the plastic during spin welding or otherwise connecting the parts from entering into the space 28 and/or into the inner volume 48 of the inner preform 21 or inner container 35. In the embodiment shown the free edge 31 of the inner preform 21 and/or of the inner container 35 is provided with an annular groove 49, between an inner wall portion 49A and an outer wall portion 49B, open in upward direction, away from the body 32. From the intermediate portion 38 a skirt 50 extends downward, preferably a peripheral skirt, into the groove 49. The groove 49 is preferably somewhat deeper than the height 51 of the skirt 50, whereas the skirt may be slightly wider than the groove 49, at least over part of its height 51. In FIG. 15 overlapping materials are shown at the top right hand corner of the groove, which may be used during spin welding, to merge the ring 10 and inner preform 21 or container 35. The free end 30 of the outer preform 20 and/or of the outer container 35 can be provided with a further annular or peripheral skirt 52, whereas the outer portion 37 of the ring may be provided, at the side facing said free edge 30, with an annular groove 53. The depth of the groove 53 may again be slightly larger than the height of the skirt 53 above the free end 30. During welding any material released from the ring 10 and/or the preforms 20, 21 or containers 12, 35 respectively may, at least to a large extend, be caught within the grooves 49, 53.

In the embodiment shown in FIGS. 14C and D and FIGS. 15A and 18A, a second labyrinth 32B type of connection is provided between the inner and outer preforms 21, 20 and the ring 10. In this embodiment the outer wall portion 49B of the groove 49 of the inner container 21 is extending further upward relative to the inner wall portion 49A thereof, forming a peripheral lip portion 49C inclined outward, such that the free edge 49D of said lip portion 49C is in close proximity of or in contact with the inner face 45 of the neck outer preform or outer container, preferably above the at least one opening 22, that is at a side of said at least one opening 22 facing towards the free ends 30, 31. In this embodiment any debris forming during connecting the ring 10, especially to the outer preform, for example by spin welding, or otherwise present at the ring will be caught by said lip portion 49C and will be trapped, prevented from entering into the space 32.

In the embodiment shown of the closure ring 10, the second wall 40 may be provided with engagement elements 54 for engaging the ring 10 during spin welding, in which the ring and preforms 20, 21 and/or containers 12, 35 are rotated relative to each other around the longitudinal axis X-X at such speed and pressure that the materials of the ring 10 and the preforms 20, 21 and/or containers 12, 35 at least partly melt and merge, such that a gas and liquid tight connection is obtained, as is schematically shown especially in the cross section of FIG. 18. Spin welding as such is a technique well known in the art and is therefore not discussed herein in extenso. The engagement elements 54, here shown as teeth, enable an easy and firm grip of the closure ring 10.

In embodiments of a method of the disclosure the preforms 20, 21 and the ring 10 can be assembled prior to blow moulding. In embodiments they can be assembled directly or shortly after injection moulding of the preforms, and then stored and shipped to a filling station, where they can be blow moulded into a container directly prior to filling the container with a beverage. In an alternative embodiment the preforms and the ring 10 can be shipped in a position in which the ring 10 is not connected to both preforms 20, 21 or at least not to one of them, such that the inner preform can be inserted into the outer preform directly prior to blow moulding the container, which would typically be close to or in line with a blow moulding apparatus and a filling station for filling beverage into the container. An advantage thereof could be that when for example a release agent is used between the inner and outer preforms, for preventing at least in part adherence between the inner and outer containers, this release agent can be applied directly prior to blow moulding, which may prevent the release agent from running, which could lead to an uneven distribution and therefore improper functioning of the release agent. Such release agent, which in itself is known in the art, could be applied for example by (dip)coating or spraying, for example using a silicon based material. In embodiments the ring could be adhered to the inner preform first, and then to the outer preform, for example after applying a release agent. In embodiments the ring 10 can be part of the inner preform, at least in part. In embodiments the ring 10 can be adhered to the outer preform only after blow moulding the container from the set of preforms. In embodiments the inner preform could be blow moulded into a container blow moulded from the outer preform.

When assembling the inner and outer preforms directly prior to blow moulding them into the container an advantage can be obtained that the preforms, and especially the inner preform, can be heated at least in part prior to inserting the inner preform into the outer preform, which facilitates accurate heating of the preforms even further.

During blow moulding of a container 3 a tool of a blow moulding apparatus, such as for example a stretch rod, heating device or the like can be inserted through the opening 34 in the ring 10, if previously provided, wherein the opening 34 is preferably slightly larger than the relevant cross section of the tool, such that pressure release of the inner volumes of the preforms is possible, at least partly passed the tool.

As can be seen in for example FIGS. 11, 15 and 18, the opening or openings 22 open into the space or interface 28 between the necks 15, 24 at a level just above the level B. In other words through such opening 22 the wall 39 and/or a lip portion 49C if applicable is visible. Any gas such as air injected into and through the opening will therefore impinge onto said wall, which is relatively rigid, and be forced down towards the body 32. By providing the or each opening in the neck region 2, it is ensured that during blow moulding of the container 3 the opening or openings 22 will not be deformed or displaced, since the neck region 2 will not deform during blow moulding.

As is shown in for example FIG. 11, a valve 9, such as but not limited to an aerosol valve type valve as is commonly known in the art and for example described in WO00/35803 or EP1506129. The valve 9 is mounted in a clinch plate 55, for example made of metal or plastic, which can be clinched onto a upper end 56 of the inner wall 42. In the embodiment shown the valve 9 is a female type aerosol type of valve. Obviously also other such valves can be used, such as but not limited to male aerosol valves and/or tilting aerosol valves and the like. Any type of valve suitable for closing off the dispense opening and for being opened by the connecting device or connector or dispense adapter can be used in the present disclosure. The valve 9 preferably extends below the level 47 of the outer portion of the closure ring 10, such that the valve 9 is well protected. The valve 9 with clinch plate 55 closes off the opening 34 and thus the inner volume of the inner container 35. In the embodiment as for example shown in FIGS. 4, 5, 7 and 8 the valve 9 is connected to a dip tube 108. In the embodiment of FIG. 5A such dip tube 108 is omitted. In this embodiment, which could be used with the container standing on its bottom and the valve 9 on top, the head space of the inner container will be emptied and removed immediately upon pressurising the container and opening the valve 9 for the first time, such that after that the entire remaining volume of the inner container will be filled with beverage when pressurised sufficiently, improving the tapping behaviour and the quality of the beverage. In this embodiment a valve body 130 of the valve 9 is biased in a manner known from for example aerosol valves, against a seal 131 by a spring enclosed within a housing 132. In this embodiment the housing is provided with relatively large side openings 133 for not unduly restriction the flow when the valve 9 is opened.

As can be seen in for example FIG. 9, the unit 4 comprises an opening 60, extending through the unit 4, such that the unit 4 can be placed over the neck region 2 of the container 3, The opening 60 can be dimensioned such that the neck region, especially the neck 15 first relatively snugly into said opening 60, up to the flange 14, as is for example shown in FIGS. 4 and 5 for the first embodiment and FIGS. 7 and 8 for the second.

FIG. 10A shows an exploded view of an embodiment of a gas connecting unit 4. This unit 4 comprises a first part 61 or housing, and a second part 62 which may also be referred to as operating ring 62. In the embodiment shown the housing 61 comprises a top part 61A and a bottom part 61B, which can enclose the second part 62 and can be screwed or otherwise connected together. Screws 63 are indicatively shown. The second part 62 has a substantially ring shaped wall 64, defining a central opening 65 extending around and/or forming part of a wall of the opening 60. Two wings 66 extend from opposite sides of the ring shaped wall 64. On the inside facing side of the wall 64 recesses 67 are provided, for receiving coupling elements 16 from below. The lower part 61A of the housing comprises a peripheral edge 68 with complementary recesses 69 through which the coupling elements 16 can pass, when aligned with the recesses 67, into or out of the recesses 67. The second part 62 is movable relative to the first part 61 such that the recesses 67 and 69 can be brought into and out off alignment, such that when in alignment the unit 4 can be placed on or removed from a container 3, whereas when out of alignment the position of the unit 4 is secured on the container or at least such placing or removing of the unit is prohibited. In the embodiment shown the relative movement is a rotation around the longitudinal axis X-X or around the longitudinal axis Y-Y of the opening 60, which may coincide with axis X-X when the unit is placed on the container.

As can be understood from the drawings, in the embodiment shown the first part 61 is provided such that the second part 62 can rotate around said axis Y-Y within the first part 61 over an angle, but is substantially prevented from any further movement, such as translations or other rotations, for example by said edge 68. By placing the unit 4 on a container 3 with the coupling elements 16 within the recesses 67, the second part 62 is substantially prevented from rotation around the axis X-X by the engaging coupling elements 16 and recesses 67. Thus a rotation of the first part 61 will lead to a movement thereof relative to the second part 62 and the container 3 around the axis X-X and thus to locking the coupling elements 16 within the recesses 67 by the edge 68. The edge 68 can engage the lower sides of the coupling elements 16. By positioning the elements 16 at a non-equal peripheral spacing, the position of the unit on the container is defined or at least only a limited and well defined number of positions is possible. In the embodiment shown there are four such coupling elements, positioned in pairs, such that two positions of the unit are possible, which differ in an orientation over 180 degrees. Obviously it could be possible to position the elements 16 such that only one such position is possible, or for example four. The opening or openings 22 can be positioned between two adjacent coupling elements 16, such that the adjacent elements 16 are closer to each other than to an next coupling element 16 of the or an other pair of such elements 16.

In the wall 64 between the relevant recesses 67 an opening 69 is provided, for example at the position of one of the wings 66. A connecting element 70 is movable relative to the opening 69, between a retracted position, as for example shown in FIG. 10 left hand side, and a forward or extended position, in which the connecting element 70 extends from the opening 69 into the opening 60, such that a forward end 71 engages the neck 12 of the container 3 at an the opening 22, such that gas can be inserted through the connecting element 70 into and through the opening 22 into the space 28 for compressing the inner container 35 within the outer container 12. A mechanism 72 is provided for forcing said movement of the connecting element 70 between the extended and the retracted position and vice versa. Such mechanism 72 can for example be operated manually, separate from the locking of the unit 4 onto the coupling elements 16, pneumatically by using pressure gas from the pressure gas source, or separate there from, or in any other suitable way.

In the embodiment shown for example in FIG. 10, left hand side, the mechanism 72 is mechanical and actuated by the rotation of the first part 61 of the unit relative to the second part 62. The connecting element 70 in this embodiment comprises a body 73 slidable with guides 74 of the wing, wherein the body 73 comprises the element 70 with a channel 75 extending from a radial inlet 76 to a forward end 77 which is open and preferably surrounded by a sealing ring 78 for sealingly engaging a preferably substantially flat surface area 79 around the opening 22. A spring element 90 can be provided between an end of the element 70 and the body 73, for biasing the element towards the extended position. The radial inlet 76 connects to a gas inlet line when the connecting element 70 is in the extended position, whereas the radial inlet is isolated from the gas inlet line when the element 70 is in the retracted position. The body 73 is provided with teeth 80 at a side thereof, engaged by complementary teeth 81 of an arm 82, pivotably supported on the wing 66 within the housing 61. At an end 83 of the arm 82 opposite the teeth 81 a spring element 84 can be provided for biasing the arm 82 and thus the teeth 80, 81 in an engaging position.

Upon rotation of the first part 61 relative to the second part 62, in the direction U in FIG. 10, the arm 82 will be pivoted, such that the teeth 80, 81 will push the body 73 in the direction R, towards the extended position of the connecting element 70. Thus when the unit 4 is positioned on the neck region 2 of a container 3, and the first part 61 is rotated in order to lock the unit 4 on the container 3, the mechanism 72 will force the connecting element 70 outward, towards the extended position, in sealing engagement with the area around the opening 22 and in fluid communication with opening 22, such fluidly connecting the gas supply with the opening 22 and thus with the space 28. When on the other hand the housing 61 is turned in the opposite direction, the connecting element 70 will be retracted and the unit 4 will be released for removal from the container 3.

As can be seen for example in FIG. 10A, on the wings 66 an indicator element 91 can be provided, visible through a window 93 of the upper housing part 61A, which indicates whether the unit 4 is locked onto the container 3 or not.

A unit 4 could be provided solely with such connecting element for connecting a gas supply to the opening 22. In such embodiment the container is preferably only provided with one opening 22, or the unit is provided with a sealing element for sealing the or each further such opening 22.

In the embodiment shown in FIGS. 10 and 10A opposite the connecting element 70 a pressure release provision 109 is provided, which can have a mechanism 94 of similar design to the mechanism 72 of the connecting element 70. FIGS. 10 and 10A show such at the right hand side of the opening 60. Again a body 74A is provided, slidable relative to the wing 66, wherein again an arm 82A with teeth 81A engages teeth 80 on the body 74A. Upon rotation of the housing 61 relative to the second part 62 the body is moved in the direction R towards an extended position. In the body 74A again a connecting element 70A with a channel 75A is provided, biased by a spring element 90A and having a sealing ring 78A at the free forward end 77A thereof for engaging an area around an opening 22 opposite the earlier described opening for allowing gas into the space 28. The channel 75A again comprises a radial outlet opening 76A, which in this case connects to a pressure relief valve system 95, especially when the element 70A is in the forward position, engaging an opening 22. The pressure relief valve 95 can be set at a desired safety pressure, sufficiently higher than the pressure required or desired for compressing the inner container 35 when dispensing a beverage there from, but below a safe maximum pressure that would be allowable in said container 3. The safety pressure could for example be set such that pressure is released when it exceeds for example 5 Bar absolute, for example when it exceeds a pressure 4 Bar, such as but not limited to a pressure above 3 Bar, which pressures are only provided by way of example and should by no means be understood as limiting. Preferably the pressure is settable by the valve system 95, more preferably only when the housing 61 is opened, which should not be done or even possible by unauthorised persons, which can for example be prohibited by closing the unit with special tools, sealing or the like. More preferably the release pressure is defined by the construction and is not settable after manufacturing of the connecting device.

In the embodiment shown in FIGS. 10B and 10C the connecting device or unit 4 differs from that as shown in FIGS. 10 and 10A in that the connecting element 70 shown on the left hand side in the FIG. 10 is connected to the gas supply line 6, whereas the other connecting element 70A is "blind", which means that it can connect to an opening 22 in the container, as described before, but gas cannot pass through said connecting element 70A such that this element functionally closes off said opening 22 it connects to. To this end for example the channel 75A can be closed and the radial outlet opening 76A can be closed. In this embodiment between the gas line 6 and the connecting element 70 a pressure relief provision 109A is provided, in line. In this embodiment the provision 109A comprises a first housing part 110 connected to the gas line 6 and provided with at least one opening 111 opening into the environment. A second housing part 112 is connected to the connecting element 70, preferably by a flexible tubing 113. The first and second housing parts 110, 112 can be connected to each other, enclosing therein a spring 114 forcing a valve body 115 with a head 119 against an inlet opening 116 of the first housing part 110. The valve body extends with a stem 117 through a washer 118 or such seal. Through the valve body a channel 120 extends with a relatively small cross section. In a normal condition the head 119 is forced against the inside of the housing part 110, such that an inlet side of the channel 120 is in communication with the gas inlet, whereas the at least one opening 11 is shielded from the gas channel 6 by the head 119. Gas can flow from the gas line 6 directly through the channel 120 and through the tubing 113 into the connecting element 70 for feeding the gas into the space 32. If however the gas pressure in the gas line 6 becomes too high, that is above a set limit, the valve body 115 will be pushed back against the spring 114, forcing the head 119 away from the gas inlet of the first housing part 110, such that gas can escape through the at least one opening 111. Preferably several such openings are provided for reducing the flow resistance to the environment. If the pressure again falls below the set limit, the valve body will regain its original position, closing off again the communication between the gas line 6 and the at least one opening 111. In an alternative embodiment the valve body and housing 110, 112 can be made such that upon increasing pressure of the gas supply through the gas supply line 6 to above an upper limit pressure the valve body will entirely close of the gas supply to the openings 22 by closing off the gas line 6. This may lead to bursting of the gas supply line 6 or coming loose thereof, but will prevent the risk of gas still flowing into the container. In embodiment a pressure release connector could be provided in the gas supply line 6.

As indicated before the second connecting element 70 can in this embodiment be similar to the one described before, but closed off or blind, such that the operation and feel of the connecting device remains substantially the same.

In FIGS. 17 and 17A schematically a container is shown in side view, with in broken lines the preforms 20, 21 from which the container has been blow moulded integrally. In FIG. 17 the bottom of the container has a petaloid shape, as known in the art. In the embodiment of FIG. 17A the bottom is hemispherical. Especially but not exclusively in the latter embodiment the container can be packaged in a outer package such as a box, for example made of cardboard, fibre board, plastic or wood, for supporting and protecting the container and/or for enabling stable positioning of the container during for example transport, storage and dispensing and other use.

In an embodiment of the unit as shown in for example FIGS. 10 and 10A the rotation of the housing 61 relative to the container 3 forces the elements 70 and 70A to move in substantially radial direction R, substantially normal to the longitudinal axis X-X, which provides for a secure movement and sealing, prevents wear and allows for easy adjustment to for example tolerances is sizes and dimensions of the neck and connecting device.

As can be seen in FIGS. 1 and 3-5, in the first embodiment the connector 7 can be connected directly to the valve 7, for example by fitting the connector 7 to the closure ring 10, especially to the third wall 43 and/or to the clinch plate 55. In the embodiment shown to that end the connector 7 has a substantially dome shaped housing 100 with a rim portion 101 that fits as a snap fitting over the outer edge 102 of the clinch plate 55 and snaps below said edge 102, against the wall 43. Preferably this snap fit is such that the dome and thus the connector 7 cannot be removed, once fitted, without damage to the connector 7 and/or the ring 10 and/or the clinch plate 55, preferably such that proper refitting the connector 7 to the same or a different container 3 is prohibited. The connector 7 comprises a stem 103 that engages the valve 9, such that the valve 9 is opened and beverage can flow from the inner container 35 through the valve into the stem 103, to further flow into a tapping line connected thereto, to be fed to a tap for dispensing. By fitting the connector 7 properly to the container 3, especially over the valve 9, the valve is thus opened and preferably cannot be opened and closed repeatedly. The connector can be fitted prior to placing the unit 4 on the container 3, or after such placing of the unit 4. The connector 7 can extend inside the opening 60, whereas the taping line can extend through or from the opening 60. The upper housing part 61A can be provided with a guide edge 104 for supporting the tapping line.

As can be seen in FIGS. 2, and 6-8 in the second embodiment the connector 11 can be connected to the unit 4, especially to the upper housing part 61A, for example by screw threads, bayonet engagement or the like. In FIGS. 2, 9 and 10A schematically cooperating elements 105A, B to that end are shown. In FIG. 8 the elements 105A are shown, locked below the elements 105B. By rotation of the connector 11 around the axis Y-Y it can be locked in this position or can be released. In this embodiment again a stem 103A is provided, extending substantially parallel to the longitudinal axis Y-Y of opening 60. The stem 103A again acts on the vale 9 for opening it and allowing beverage to be passed from the inner volume of the inner container 35 to a tapping line connected to the connector 11. The tapping line can in this embodiment be part of a tapping device with for example an in line cooler 106, schematically shown in FIG. 2 in part. In this embodiment a non-return valve 107 is shown in the connector 11, between the stem 103A and the tapping line, such that liquid or gas is substantially prevented from flowing back into the stem from the tapping line. Again the connector 11 can be placed in the unit 4 after the unit has been placed on the container, or before, and can be removed from the unit 4 before or after the unit is removed from the container 3.

When the placement or removal of the connector 7, 11 is or at least can at least partly be independent from placing and/or removing of the unity onto or from the container, the connector, especially connector 11 can be removed from the container, for example for cleaning, without decompression of the container.

In FIGS. 4, 5, 7 and 8 the connecting elements have been shown in a retracted position, for clarity. When the connecting device is placed and rotated appropriately, as described, they are brought into close connection with the neck and are connected to the at least one opening 22, as also described before.

In the embodiments shown the outer preform 20 has a body forming portion which is substantially cylindrical with a longitudinal axis X-X and closed off at the bottom by a bottom forming portion. The cylindrical portion has a maximum cross section or maximum diameter Db and preferably a substantially constant outer diameter Db over its cylindrical length Lb between the flange 14 and the bottom forming portion, wherein the body forming portion may have a draft over said length Lb, suitable for release from an injection moulding mould, as is known to the person skilled in the art. The maximum diameter Db is preferably smaller than that of the flange 14, if applicable. The neck portion or region preferably is also substantially cylindrical with a longitudinal axis X-X substantially coinciding with the longitudinal axis of the body forming portion. The substantially cylindrical part of the neck region has an average outer diameter Dn(out) which is larger than the maximum diameter Db. In the embodiment shown the neck portion has a substantially constant outer diameter Dn(out) above the flange 14. The wall thickness of the neck region of the outer preform 20 is preferably slightly smaller than that of at least most of the body forming portion. In the embodiment shown the inner surface 45 of the neck region of the outer preform is positioned above and substantially coinciding with the outer surface of the body forming portion of said preform 20, or positioned only slightly inward, providing for the shoulder on which the inner container can be supported. The inner surface of the body forming portion of the outer preform 20 slopes inward over a part directly adjacent the flange 14. The wall part comprising the sloping surface will during blow moulding form at least most of a shoulder of the outer container. Over at least part of this sloping surface and/or the facing surface part of the adjacent inner container spacing elements and/or channel forming parts are provided which remain at least partly open during and after blow moulding the container from the preforms, allowing gas to be inserted from said at least one opening 22 into the space between the body forming portions of the container. Such outer preform can be manufactured easily, by injection moulding, without complicated movable parts in the mould. Only for forming the at least one opening and the coupling elements at least one part has to be provided in the injection moulding mould moving in a direction different from a direction parallel to the longitudinal axis X-X of the preforms. In the embodiments shown the coupling elements 16 are provided substantially as tubular elements 16 having a release direction in a mould parallel to the release direction of the at least one opening 22, such that they can easily be formed by the same mould part.

In FIG. 19A-D an embodiment of a preform assembly 19 is shown again, in longitudinal section through a mid sectional plane along the line A-A in FIG. 19C, in both assembled condition (FIG. 19A) and pre assembling (FIG. 19B) and, in FIG. 19C, in cross section along the line B-B in FIG. 19A. FIG. 19D shows a detail of FIG. 19C.

In FIG. 20A-D an embodiment of a preform assembly 20 is shown again, in longitudinal section through a mid sectional plane along the line A-A in FIG. 20C, in both assembled condition (FIG. 20A) and pre assembling (FIG. 20B) and, in FIG. 20C, in cross section along the line B-B in FIG. 20A. FIG. 20D shows a detail of FIG. 20C.

These preform assemblies can for example be similar to the assembly according to FIG. 14. Only some details will be discussed herein, whereas for the further description reference is made to the earlier descriptions of the preform assembly 19 and parts thereof, including the closure ring 10.

FIG. 19B shows the outer preform 20, the inner preform 21 and the closure ring 10, aligned for assembling. In FIG. 19B the shoulder forming part 123 of the inner preform 21 is only partly cut away, such that the cut through 122 and the spacing elements and/or channel forming parts 122A can be clearly seen in side view. The neck region 24 with the shoulder 26 is shown, being wider than the body forming portion 25. The shoulder forming part 123 is slightly frusto conical, widening from the body forming portion 25 to the neck region 24. In the outer periphery of the neck region 24 at least one, and in the embodiment shown two diametrically opposed cut outs 22 are provided, though the neck region 24, extending in longitudinal direction thereof and open to the peripheral surface. On the outer surface of the shoulder forming portion 123 of the inner preform 21 directly below the cut out 122 spacer elements 27 are provided, formed by two adjacent ribs 122B enclosing a channel 122A there between. This channel 122A extends from the cut out 122 towards at least near and preferably passed the end of the shoulder forming portion 123 at the side of the body forming portion 25. Thus it is prevented that when blow moulding the container from the assembly, the outer preform 20 can fully engage the outer surface of the shoulder forming part 123 of the inner container, thus obstructing a pressure fluidum from entering into the space the between the then formed inner and outer containers.

By providing two diametrically opposed cut throughs 122 and adjacent channels 122A, the spacer elements 27 can be formed relatively easy in mold parts releasing to two opposite sides. When assembled, as can be seen in FIGS. 19A and B, the outer surface of the inner preform and the inner surface of the outer preform will be spaced apart mostly, over a distance approximately similar to the radial height of the ribs 122B. The ribs 122B are placed relatively close together, such that the channel 122A will remain open, even after blow moulding the container.

When assembling the preforms 20, 21, preferably the cut throughs 122 and adjacent channels 122A are positioned such that the openings 22 open adjacent said cut throughs 122. However, as can be seen in FIG. 19B, the shoulder 23 on which the shoulder 26 can rest can be provided with a stepped surface such that there will always be sufficient openings between the shoulders 23, 26 for allowing a pressure fluid to proceed from the opening 22 or openings 22 into the channel or channels 122A and into the space between the inner and outer preforms. In this embodiment again the length X1 of the inner preform is significantly smaller than the length X2 of the outer preform 20, as shown and discussed with reference to FIG. 14A, for the same or similar reasons.

In FIG. 20 an alternative embodiment of a preform assembly is shown, both pre assembling (FIG. 20B) and in assembled condition (FIG. 20A) In this embodiment the spacing elements 7 are primarily formed on the inner surface of the outer preform 20, at least in the shoulder forming part 23 thereof. In the embodiment shown again, as discussed with reference to FIG. 19, the elements 7 can be formed as channels 122A between adjacent ribs 122B, which channels open in lower parts 7A of a stepped surface 7b of the shoulder 23 on which the shoulder 26 of the inner preform 20 can come to rest. In this embodiment there are several such channels 122A, preferably more than two, for example six, spaced around the periphery of the inner surface of the shoulder forming portion, 23, as shown in FIG. 20C. By increasing the number of channels 122A the area for allowing a pressure medium to flow from the opening or openings 22 is increased, better ensuring proper pressurising of the space between the inner and outer containers after blow moulding. Moreover, these channels can be more easily maintained at least in part during blow moulding, due to their positioning on the outer preform 20. By providing them on the inner surface of the outer preform it is easier to manufacture a multitude of such channels. During blow moulding the inner preform may be heated to a higher temperature, which could be detrimental to the channels if they are provided on the inner preform. The inner preform will be more fluid during blow moulding, which would reduce the accuracy of the shape of the ribs and thus of the remaining channel. Especially since during blow moulding the pressure exerted for forming the container will be from the inside out, meaning that the inner preform will be pushed against the inner surface of the outer preform. Again, providing the ribs and channels on the outer preform will then be advantageous for maintaining the proper profiles of the ribs and channels.

In the embodiments shown the height H of the ribs 122B can be similar to the radial distance between the preforms 20, 21 in the neck region and/or shoulder forming part 23 of the preforms, for example a few millimetres.

In this embodiment the lengths X1 and X2 are again as similar as possible, as described with reference to FIG. 14D, for the same or similar reasons.

Obviously the configuration of the elements 7 and/or the neck region configuration of FIG. 20 could be used in a set of preforms according to FIG. 19 or vice versa, or in the embodiments of FIG. 14.

It is preferred that the spacing elements and/or channel forming parts 122 are at least mainly formed on the inside surface of the outer preform 20, at least in the shoulder forming part or region 123 thereof. This can have a number of advantages, including but not limited to that the wall thickness of the outer preform may be larger, that during blow moulding there may be less deformation in the outer preform, especially in the shoulder forming part or region 123, so that the shape and dimensions of the spacing elements and/or channel forming parts 122 will be maintained more easily. Moreover, when the shoulder forming part 123 widens in the direction of the open upper end 30, these spacing elements and/or channel forming parts 122 can easily be formed by a releasing core of an injection moulding mould, providing sufficient draft. Moreover, by providing them on the outer preform there may be less stress in the container formed, In the embodiments shown gas or such pressure fluid will be introduced in a substantially radial direction $A_{in}$ of the neck portion of the container, i.e. at an angle α relative to the axis X-X of the neck, which angle α preferably is between 30 and 150 degrees, more preferably between 45 and 135 degrees and more preferably about 90 degrees. By this direction the safety of the assembly can be increased, for example because the pressure exerted by the gas is not in a direction in which the connecting device can be removed from the container. Moreover, the direction is such that the gas will aid in providing passage for the gas into said space between the containers. Furthermore by providing the at least one opening in a wall of the neck region the gas inlet will not interfere with the positioning of the beverage dispense line or tube or the removal thereof. By moving the connecting element or elements between the extended and the retracted position in substantially radial direction, wear of the elements will be prevented such that safety is further enhanced. By providing an over pressure safety in the connecting device overpressure in the container can be avoided and/or resolved easily. By providing the at least one inlet opening 22 at a level such that it faces a wall part of the ring, i.e. for example at a level above the free end of the inner container 21, it is further ensured that the passage of gas between the opening 22 and the space 32 between the containers is not obstructed. In the embodiments shown having the lip portion 49C gas flow will be directed by the sloping surface of the lip portion 49C towards the space 32.

In embodiment the source of the pressurised gas can be or at least can comprise a compressor for air. Preferably the direction of the compressor is reversible, such that when the inner container 35 is emptied to a desired extend, the air can be sucked from the space 28 through the relevant opening 22, with the valve 9 still closed, which would lead to reducing the volume of the container since the outer container 12 will be compressed by pressure reduction within it. This will significantly reduce the volume of the container to be discarded.

The invention is by no means limited to the embodiments specifically disclosed and discussed here above. Many variations thereof are possible, including but not limited to combinations of parts of embodiments shown and described. For example the at least one opening 22 can be provided in a different position, for example extending through the ring 10, preferably in substantially radial direction outward, for example through the inner surface 39 or wall 40 of the ring, into the space 32 between the containers, wherein the connecting device can extend into the ring for communicating properly with said at least one opening. The container can be provided with only one opening in the neck or several such openings. In embodiments the relative movement of the first and second parts of the connecting device can be obtained at least partly by relative translation.

The invention claimed is:

1. A connecting device for connecting at least a gas line to a container, wherein the container is a bag-in-container type of container wherein the connecting device comprises a first part and a second part coupled to the first part, movably connected to said first part, wherein at least one of the first and/or second part is provided with a coupling opening with coupling elements for connecting the device to a part of the bag-in-container type container extending inside said coupling opening, wherein the connecting device is further provided with at least one gas connecting element that is configured for introducing gas under pressure into a space between an inner container and an outer container of the container, movable between an extended position for direct contact of the at least one gas connecting element with the bag-in-container type of container extending inside said coupling opening, in which extended position the gas connecting element extends at least partly inside said coupling opening of said second part of the connecting device, and a retracted position in which the gas connecting element extends less or not into said coupling opening, the connecting device further comprising a mechanism for moving the at least one gas connecting element between the extended position and the retracted position by a relative movement of the first and second parts.

2. The connecting device according to claim 1, wherein a gas inlet line is coupled to the at least one gas connecting element.

3. The connecting device according to claim 1, wherein the connecting device comprises a pressure relief valve, in a connecting line for a source of pressurised gas or for connecting to a first opening or to a second opening provided in a neck region of the container.

4. The connecting device according to claim 3, wherein the first and second opening are positioned radially opposite each other.

5. The connecting device according to claim 1, wherein the coupling opening can surround a neck of the bag-in-container type of container inserted into said opening, such that the connecting device can only be placed onto the container by movement substantially parallel to a longitudinal axis (Y-Y) of said opening.

6. The connecting device according to claim 1, wherein the gas connecting element is in fluid connection with the gas line.

7. The connecting device according to claim 1, further comprising an opening in a side wall of a neck portion of a first container that opens into a space between the first container and a second container in a substantially radial direction, wherein the connecting element is configured to connect to the opening in the substantially radial direction.

8. The connecting device according to claim 1, the mechanism comprising a pivotal arm configured to engage a body of the at least one gas connecting element, wherein the relative movement of the first part and the second part rotates the pivotal arm, which moves the at least one gas connecting element between the extended position and the retracted position.

9. The connecting device according to claim 1, wherein the at last one gas connecting element is independently movable between the extended position and the retracted position with respect to movement of the coupling elements to connect the connecting device to the bag-in-container type of container.

10. The connecting device according to claim 1, wherein the at last one gas connecting element is at least movable by the mechanism between the extended position and the retracted position when the coupling elements connect the connecting device to the bag-in-container type of container.

11. A connecting device for connecting at least a gas line to a container, wherein the container is a bag-in-container type of container wherein the connecting device comprises a first part and a second part, movably connected to said first part, wherein at least one of the first and/or second part is provided with a coupling opening with coupling elements for connecting the device to a part of the bag-in-container type container extending inside said coupling opening, wherein the connecting device is further provided with at least one gas connecting element that is configured for introducing gas under pressure into a space between an inner container and an outer container of the container, movable between an extended position for direct contact of the at least one gas connecting element with the bag-in-container type of container extending inside said coupling opening, in which extended position the gas connecting element extends at least partly inside said coupling opening of said second part of the connecting device, and a retracted position in which the gas connecting element extends less or not into said coupling opening, the connecting device further comprising a mechanism for moving the at least one gas connecting element between the extended position and the retracted position by relative movement of the first and second parts, wherein a gas inlet line is coupled to the at least one gas connecting element.

12. The connecting device according to claim 11, wherein the at last one gas connecting element is independently movable between the extended position and the retracted position with respect to movement of the coupling elements to connect the connecting device to the bag-in-container type of container.

13. The connecting device according to claim 11, wherein the at last one gas connecting element is at least movable by the mechanism between the extended position and the retracted position when the coupling elements connect the connecting device to the bag-in-container type of container.

14. A connecting device for connecting at least a gas line to a container, wherein the container is a bag-in-container type of container wherein the connecting device comprises a first part and a second part coupled to the first part, movably connected to said first part, wherein at least one of the first and/or second part is provided with a coupling opening with coupling elements for connecting the device to a part of the bag-in-container type container extending inside said coupling opening, wherein the connecting device is further provided with at least one gas connecting element that is configured for introducing gas under pressure into a space between an inner container and an outer container of the container, movable between an extended position in which the gas connecting element extends at least partly inside said coupling opening of said second part of the connecting device and a retracted position in which the gas connecting element extends less or not into said coupling opening, the connecting device further comprising a mechanism for moving the at least one gas connecting element between the extended position and the retracted position by a relative movement of the first and second parts, further comprising an opening in a side wall of a neck portion of a first container that opens into a space between the first container and a second container in a substantially radial direction, wherein the connecting element is configured to connect to the opening in the substantially radial direction.

15. A connecting device for connecting at least a gas line to a container, wherein the container is a bag-in-container type of container wherein the connecting device comprises a first part and a second part coupled to the first part, movably connected to said first part, wherein at least one of the first and/or second part is provided with a coupling opening with coupling elements for connecting the device to a part of the bag-in-container type container extending inside said coupling opening, wherein the connecting device is further provided with at least one gas connecting element that is configured for introducing gas under pressure into a space between an inner container and an outer container of the container, movable between an extended position in which the gas connecting element extends at least partly inside said coupling opening of said second part of the connecting device and a retracted position in which the gas connecting element extends less or not into said coupling opening, the connecting device further comprising a mechanism for moving the at least one gas connecting element between the extended position and the retracted position by a relative movement of the first and second parts, the mechanism comprising a pivotal arm configured to engage a body of the at least one gas connecting element, wherein the relative movement of the first part and the second part rotates the pivotal arm, which moves the at least one gas connecting element between the extended position and the retracted position.

* * * * *